(12) United States Patent
Noh et al.

(10) Patent No.: US 11,199,852 B2
(45) Date of Patent: Dec. 14, 2021

(54) MOBILE ROBOT AND CONTROL METHOD FOR CONTROLLING THE SAME

(71) Applicant: LG ELECTRONICS INC., Seoul (KR)

(72) Inventors: Dongki Noh, Seoul (KR); Juhyeon Lee, Seoul (KR); Junghwan Kim, Seoul (KR); Seungmin Baek, Seoul (KR); Wonkeun Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 305 days.

(21) Appl. No.: 16/327,454

(22) PCT Filed: Aug. 24, 2017

(86) PCT No.: PCT/KR2017/009260
§ 371 (c)(1),
(2) Date: Feb. 22, 2019

(87) PCT Pub. No.: WO2018/038553
PCT Pub. Date: Mar. 1, 2018

(65) Prior Publication Data
US 2019/0176330 A1 Jun. 13, 2019

(30) Foreign Application Priority Data

Aug. 25, 2016 (KR) .................. 10-2016-0108384
Aug. 25, 2016 (KR) .................. 10-2016-0108385
Aug. 25, 2016 (KR) .................. 10-2016-0108386

(51) Int. Cl.
*G05D 1/02* (2020.01)
*B25J 9/00* (2006.01)
(Continued)

(52) U.S. Cl.
CPC .............. *G05D 1/0246* (2013.01); *A47L 9/28* (2013.01); *B25J 5/007* (2013.01); *B25J 9/00* (2013.01);
(Continued)

(58) Field of Classification Search
CPC ........ G05D 1/0246; G06N 20/00; A47L 9/28; B25J 9/00; B25J 9/16; B25J 9/1666;
(Continued)

(56) References Cited

U.S. PATENT DOCUMENTS

2010/0298977 A1* 11/2010 Fahn .................... G05D 1/0246
                                                          700/259
2015/0142169 A1*  5/2015 Kim .................... A47L 11/4069
                                                          700/245
(Continued)

FOREIGN PATENT DOCUMENTS

EP      1950689 A2    7/2008
JP      H1132253      2/1999
(Continued)

OTHER PUBLICATIONS

Current claim set for the copending U.S. Appl. No. 16/463,758.*
(Continued)

*Primary Examiner* — Khoi H Tran
*Assistant Examiner* — Nhi Q Bui
(74) *Attorney, Agent, or Firm* — Finnegan, Henderson, Farabow, Garrett & Dunner, LLP

(57) ABSTRACT

A mobile robot includes a travel drive unit configured to move a main body, an image acquisition unit configured to acquire a plurality of images by continuously photographing surroundings of the main body, a storage configured to store the plurality of continuous images acquired by the image acquisition unit, a sensor unit having one or more sensors configured to sense an object during the movement of the
(Continued)

main body, and a controller configured to, in response to the sensing of the object by the sensor unit, select an image acquired at a specific point in time earlier than an object sensing time of the sensor unit from among the plurality of continuous images based on a moving direction and a moving speed of the main body, and recognize an attribute of the object included in the selected image acquired at the specific point in time.

18 Claims, 22 Drawing Sheets

(51) Int. Cl.
| | |
|---|---|
| *B25J 11/00* | (2006.01) |
| *B25J 9/16* | (2006.01) |
| *A47L 9/28* | (2006.01) |
| *B25J 19/02* | (2006.01) |
| *G01S 15/931* | (2020.01) |
| *B25J 5/00* | (2006.01) |
| *G06N 20/00* | (2019.01) |
| *G06K 9/00* | (2006.01) |

(52) U.S. Cl.
CPC .............. *B25J 9/16* (2013.01); *B25J 9/1666* (2013.01); *B25J 9/1697* (2013.01); *B25J 11/00* (2013.01); *B25J 11/0085* (2013.01); *B25J 19/02* (2013.01); *B25J 19/023* (2013.01); *G01S 15/931* (2013.01); *G05D 1/0221* (2013.01); *G05D 1/0234* (2013.01); *G05D 1/0272* (2013.01); *G06K 9/00664* (2013.01); *G06N 20/00* (2019.01); *G05D 2201/0203* (2013.01)

(58) Field of Classification Search
CPC ...... B25J 9/1697; B25J 11/00; B25J 11/0085; B25J 19/02; B25J 19/023
See application file for complete search history.

(56) References Cited

U.S. PATENT DOCUMENTS

| | | | |
|---|---|---|---|
| 2015/0336274 | A1* | 11/2015 | Connell, II ................ B25J 9/16 700/259 |
| 2016/0167226 | A1 | 6/2016 | Schnittman |

FOREIGN PATENT DOCUMENTS

| | | |
|---|---|---|
| JP | 2016-134145 | 7/2016 |
| KR | 10-2009-0112984 | 10/2009 |
| KR | 10-2012-0109247 | 10/2012 |
| KR | 10-2013-0042389 | 4/2013 |
| KR | 10-2015-0142475 | 12/2015 |

OTHER PUBLICATIONS

European Search Report dated May 19, 2020.
Japanese Office Action for Application No. 2019-510776.
PCT Search Report dated Aug. 25, 2016.

* cited by examiner

FIG. 13

| SUPER-CLASS | CLASS |
|---|---|
| DANGEROUS OBJECT | FAN |
| | HOME THEATER |
| | MULTIPLUG |
| | LAMP BASE |
| | HUMAN HAIR |
| | ⋮ |
| NON-DANGEROUS OBJECT | BUMP |
| | ⋮ |

FIG. 14

| RECOGNITION RESULT | CONFIDENCE |
|---|---|
| FAN | 0.95 |
| HOME THEATER | 0.7 |

⇒ FAN (a)

| RECOGNITION RESULT | CONFIDENCE |
|---|---|
| FAN | 0.35 |
| HOME THEATER | 0.4 |

⇒ UNKNOWN DATA (b)

| RECOGNITION RESULT | CONFIDENCE |
|---|---|
| FAN | 0.95 |
| HOME THEATER | 0.9 |

⇒ DANGEROUS OBJECT (c)

| ORDER | CURRENT RECOGNITION RESULT | TOTAL CONFIDENCE | REGISTRATION RESULT |
|---|---|---|---|
| 1 | FAN (CONFIDENCE:0.7, $R_{p1}$) | FAN:0.8 | FAN |
| 2 | FAN (CONFIDENCE:0.7, $R_{p2}$) | FAN:0.75 | FAN |
| 3 | LAMP BASE (LAMP BASE:0.7, $R_{p3}$) | FAN:0.75, LAMP BASE:0.7 | FAN |

| ORDER | CURRENT RECOGNITION RESULT | TOTAL CONFIDENCE | REGISTRATION RESULT |
|---|---|---|---|
| 1 | FAN (CONFIDENCE:0.8, $R_{p1}$) | FAN:0.8 | FAN |
| 2 | FAN (CONFIDENCE:0.7, $R_{p2}$) | FAN:0.835 | FAN |
| 3 | LAMP BASE (LAMP BASE:0.7, $R_{p3}$) | FAN:0.835, LAMP BASE:0.7 | FAN |

MOBILE ROBOT AND CONTROL METHOD FOR CONTROLLING THE SAME

CROSS-REFERENCE TO RELATED APPLICATIONS

This application is a U.S. National Phase entry under 35 U.S.C. § 371 from PCT International Application No. PCT/KR2017/009260, filed Aug. 24, 2017, which claims the benefit of priority of Korean Patent Applications Nos. 10-2016-0108384, 10-2016-0108385, and 10-2016-0108386, all filed Aug. 25, 2016, the contents of which are incorporated herein by reference in their entireties.

TECHNICAL FIELD

The present invention relates to a mobile robot and a method for controlling the same, and, more particularly, to a mobile robot capable of performing object recognition and avoidance and a method for controlling the mobile robot.

BACKGROUND ART

Robots have been developed for industry and has taken charge of a portion of factory automation. As the robots have recently been used in more diverse fields, medical robots, aerospace robots, etc. have been developed, and domestic robots for ordinary households are also being made. Among those robots, a robot capable of traveling on its own is referred to as a mobile robot.

A typical example of mobile robots used in households is a robot cleaner, which cleans a predetermined area by suctioning ambient dust or foreign substances while traveling in the predetermined area on its own.

A mobile robot is capable of moving on its own and thus has freedom to move, and the mobile robot is provided with a plurality of sensors to avoid an object during traveling so that the mobile robot may travel while detouring around the object.

In general, an infrared sensor or an ultrasonic sensor is used to sense an object by the mobile robot. The infrared sensor determines presence of an object and a distance to the object based on an amount of light reflected by the object or a time taken to receive the reflected light, whereas the ultrasonic sensor emits an ultrasound wave having a predetermined period and, in response to ultrasonic waves reflected by an object, determines a distance to the object based on a difference between the time to emit the ultrasonic waves and the time for the ultrasonic waves to return to the object.

Meanwhile, object recognition and avoidance significantly affects not just driving performance but also cleaning performance of the mobile robot, and thus, it is required to secure reliability of an object recognizing capability.

A related art (Korean Patent Registration No. 10-0669892) discloses a technology that embodies highly reliable object recognition by combining an infrared sensor and an ultrasonic sensor.

However, the related art (Korean Patent Registration No. 10-0669892) has a problem in its incapability of determining an attribute of an object.

FIG. 1 is a diagram for explanation of a method for sensing and avoiding an object by a conventional mobile robot.

Referring to FIG. 1, a robot cleaner performs cleaning by suctioning dust and foreign substance while moving (S11). The robot cleaner recognizes presence of an object in response to sensing, by an ultrasonic sensor, an ultrasonic signal reflected by an object (S12), and determines whether the recognized object has a height that the robot cleaner is able to climb (S13).

If it is determined the recognized object has a height that the robot cleaner is not able to climb, the robot cleaner may move in a forward direction (S14), and, otherwise, rotate by 90 degrees (S15).

For example, if the object is a low door threshold, the robot cleaner recognizes the door threshold, and, if a recognition result indicates that the door threshold is low enough to pass through, the robot cleaner moves over the door threshold.

However, if an object determined to have a height which the robot cleaner is able to climb is an electric wire, the robot cleaner may be possibly confined and thus restricted by the electric wire when moving over the electric wire.

In addition, since a fan base has a height similar to or lower than a height of a threshold, the robot cleaner may determine that the fan base is an object that the robot cleaner is able to climb. In this case, when attempting to climb the fan base, the robot cleaner may be restricted with wheels spinning.

In addition, in the case where, not an entire human body, but a part of human hair is sensed, the robot cleaner may determine that the human hair has a height that the robot cleaner is able to climb, and travel forward, but, in this case, the robot cleaner may suction the human hair which possibly cause an accident.

Thus, a method for identifying an attribute of a front object and change a moving pattern according to the attribute is required.

Meanwhile, interests for machine learning such as artificial intelligence and deep learning have grown significantly in recent years.

Machine learning is one of artificial intelligence fields, and refers to training computer with data and instruct the computer to perform a certain task, such as prediction and classification, based on the data.

The representative definition of machine learning is proposed by Professor Tom M. Mitchell, as follows: "if performance at a specific task in T, as measured by P, improves with experience E, it can be said that the task T is learned from experience E." That is, improving performance with respect to a certain task T with consistent experience E is considered machine learning.

Conventional machine learning focuses on statistics-based classification, regression, and clustering models. In particular, regarding map learning of the classification and regression models, a human defines properties of training data and a learning model of distinguishing new data based on the properties.

Meanwhile, unlike the conventional machine learning, deep learning technologies have been being developed recently. Deep learning is an artificial intelligence technology that enables a computer to learn on its own like a human on the basis of Artificial Neural Networks (ANN). That is, deep learning means that a computer discovers and determines properties on its own.

One of factors having accelerated development of deep learning may be, for example, deep learning frameworks that is provided as an open source. For example, deep learning frameworks include Theano developed by University of Montreal, Canada, Torch developed by New York University, U.S.A., Caffe developed by University of California, Berkeley, TensorFlow developed by Google, etc.

With disclosure of deep learning frameworks, a learning process, a learning method, and extracting and selecting data used for learning have become more important in addition to a deep learning algorithm for the purposes of effective learning and recognition.

In addition, more and more efforts are being made to use artificial intelligence and machine learning in a diversity of products and services.

DISCLOSURE

Technical Problem

One object of the present invention is to provide a mobile robot and a method for controlling the mobile robot, the mobile robot which is capable of acquiring image data for improving accuracy in object attribute recognition.

Another object of the present invention is to provide a mobile robot, which is capable of determining an attribute of an object and adjusting a traveling pattern according to the attribute of the object to thereby perform highly reliable object recognition and avoidance, and a method for controlling the mobile robot.

Yet another object of the present invention is to provide a mobile robot and a method for controlling the mobile robot, the mobile robot which is capable of moving forward, moving backward, stopping, detouring, and the like according to a recognition result on an object, thereby enhancing stability of the mobile robot and user convenience and improving operational efficiency and cleaning efficiency.

Yet another object of the present invention is to provide a mobile robot capable of accurately recognizing an attribute of an object based on machine learning, and a method for controlling the mobile robot.

Yet another object of the present invention is to provide a mobile robot capable of performing machine learning efficiently and extracting data for object attribute recognition, and a method for controlling the mobile robot.

Technical Solution

In order to achieve the above or other objects, a mobile robot in one general aspect of the present invention includes: a travel drive unit configured to move a main body; an image acquisition unit configured to acquire a plurality of images by continuously photographing surroundings of the main body; a storage configured to store the plurality of continuous images acquired by the image acquisition unit; a sensor unit having one or more sensors configured to sense an object during the movement of the main body; and a controller is configured to, when the sensor unit senses the object, select, based on a moving direction and a moving speed of the main body, an image acquired at a specific point in time earlier than an object sensing time of the sensor unit from among the plurality of continuous images, and recognize an attribute of the object included in the selected image acquired at the specific point in time, and accordingly, it is possible to recognize an attribute of an obstacle accurately and register and manage an object area.

In addition, in order to achieve the above or other objects, a mobile robot in one general aspect of the present invention includes a travel control module configured to control driving of a travel control unit based on a final attribute of a recognized object, and accordingly, it is possible to improve stability, user convenience, operation efficiency, and cleaning efficiency.

In addition, in order to achieve the above or other objects, a method for controlling a mobile robot in one general aspect of the present invention may include: acquiring a plurality of images by continuously photographing surroundings of a main body during traveling; storing the plurality of continuous images acquired by the image acquisition unit; sensing an object by the sensor unit; when the sensing unit senses the object, select, based on a moving direction and a moving speed of the main body, an image acquired at a specific point in time earlier than an object sensing time of the sensor unit from among the plurality of continuous images; recognizing an attribute of the object included in the selected image acquired at the specific point in time; and controlling driving of the travel control unit based on the recognized attribute of the object.

Advantageous Effects

According to at least one of the embodiments of the present invention, it is possible to acquire image data that helps increase accuracy of recognizing an attribute of an object.

According to at least one of the embodiments of the present invention, since a mobile robot is able to determine an attribute of an object accurately and adjust a traveling pattern according to the attribute of the object, it is possible to perform highly reliable object recognition and avoidance.

In addition, according to at least one of the embodiments of the present invention, it is possible to provide a mobile robot, which is capable of moving forward, moving backward, stopping, detouring, and the like according to a recognition result on an object to enhance user convenience and improve operational efficiency and cleaning efficiency, and a method for controlling the mobile robot.

In addition, according to at least one of the embodiments of the present invention, it is possible to provide a mobile robot and a method for controlling the mobile robot, the mobile robot which is capable of accurately recognizing an attribute of an object based on learning machine.

In addition, according to at least one of the embodiments of the present invention, it is possible for a mobile robot to perform machine learning efficiently and extract data for recognition Meanwhile, other effects may be explicitly or implicitly disclosed in the following detailed description according to embodiments of the present invention.

DESCRIPTION OF DRAWINGS

FIGS. 13 and 14 are diagrams for explanation of object recognition of the object recognition module.

BEST MODE

Figure 1:
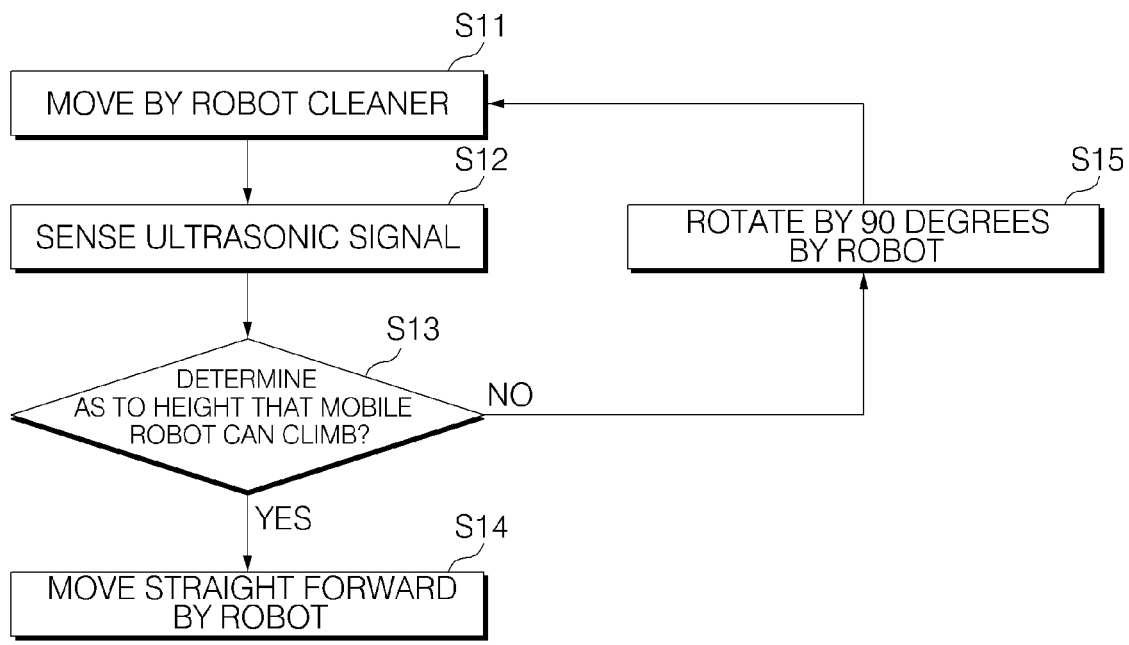
FIG. 1 is a diagram for explanation of a method for sensing and avoiding object by a conventional robot cleaner.

Hereinafter, embodiments of the present invention will be described in detail with reference to the accompanying drawings. While the invention will be described in conjunction with exemplary embodiments, it will be understood that the present description is not intended to limit the invention to the exemplary embodiments.

In the drawings, in order to clearly and briefly describe the invention, parts which are not related to the description will be omitted, and, in the following description of the embodiments, the same or similar elements are denoted by the same reference numerals even though they are depicted in different drawings.

In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other.

A mobile robot 100 according to an embodiment of the present invention refers to a robot capable of moving on its own using wheels and the like, and may be a domestic robot, a robot cleaner, etc. A robot cleaner having a cleaning function is herein after described as an example of the mobile robot, but the present invention is not limited thereto.

Figure 2:
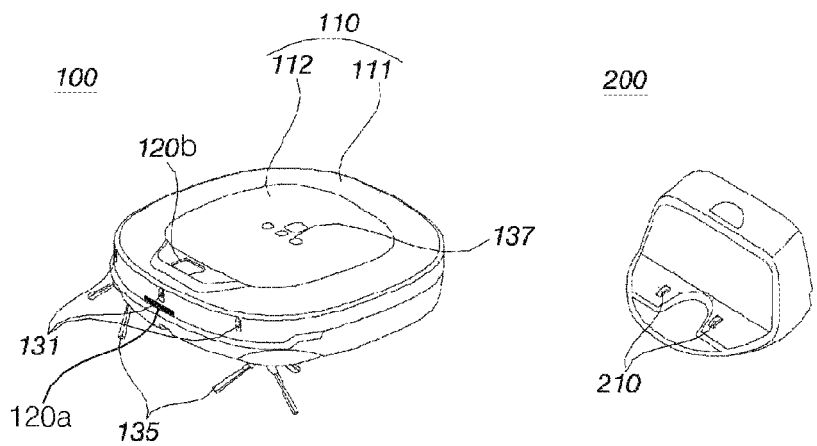
FIG. 2 is a perspective view of a mobile robot according to an embodiment of the present invention and a base station for charging the mobile robot.

FIG. 2 is a perspective view of a mobile robot and a charging station for charging the mobile robot according to an embodiment of the present invention.

Figure 3:
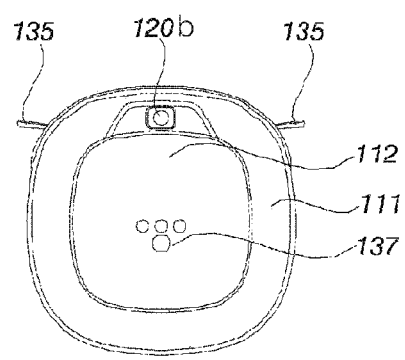
FIG. 3 is a view of the top section of the mobile robot in FIG. 2.
Figure 4:
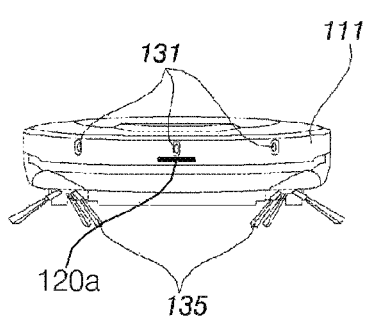
FIG. 4 is a view of the front section of the mobile robot in FIG. 2.
Figure 5:
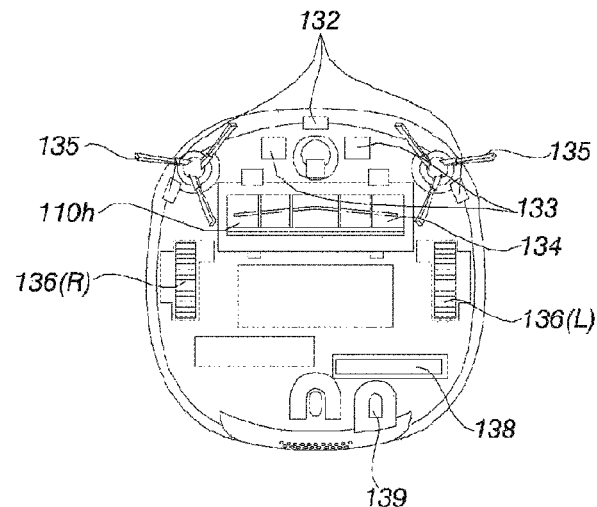
FIG. 5 is a view of the bottom section of the mobile robot in FIG. 2.

FIG. 3 is a view of the top section of the mobile robot illustrated in FIG. 2, FIG. 4 is a view of the front section of the mobile robot illustrated in FIG. 2, and FIG. 5 is a view of the bottom section of the mobile robot illustrated in FIG. 2.

Figure 6:
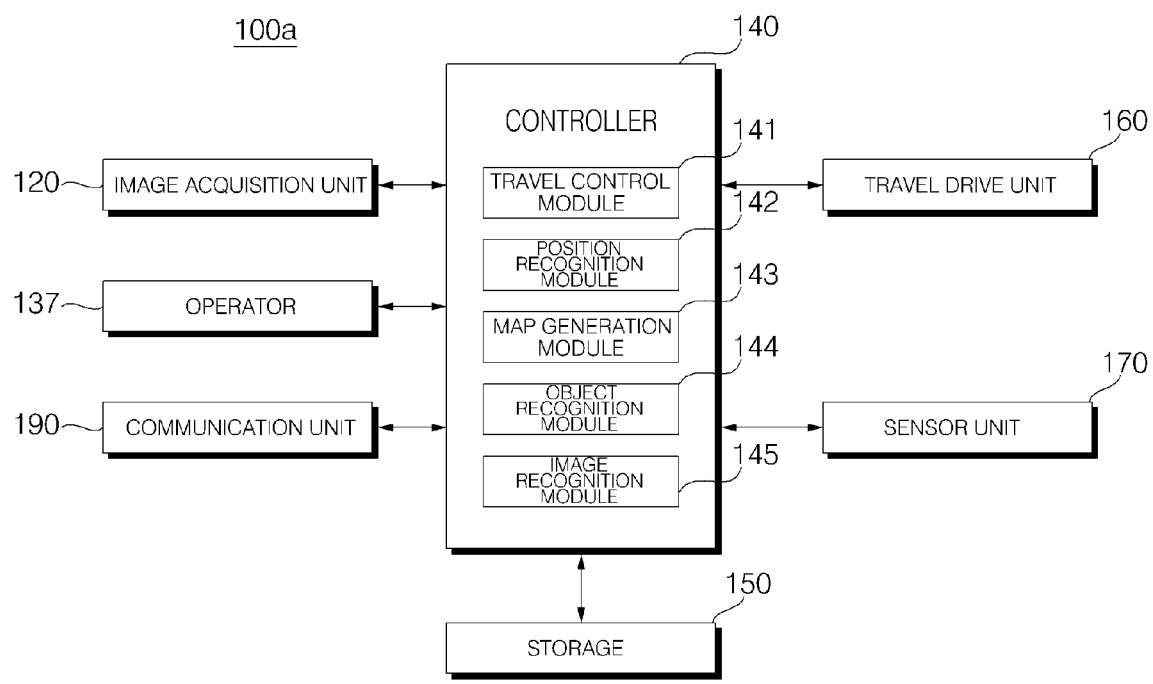
FIGS. 6 and 7 are block diagram of a control relationship between major components of a mobile robot according to an embodiment of the present invention.
Figure 7:
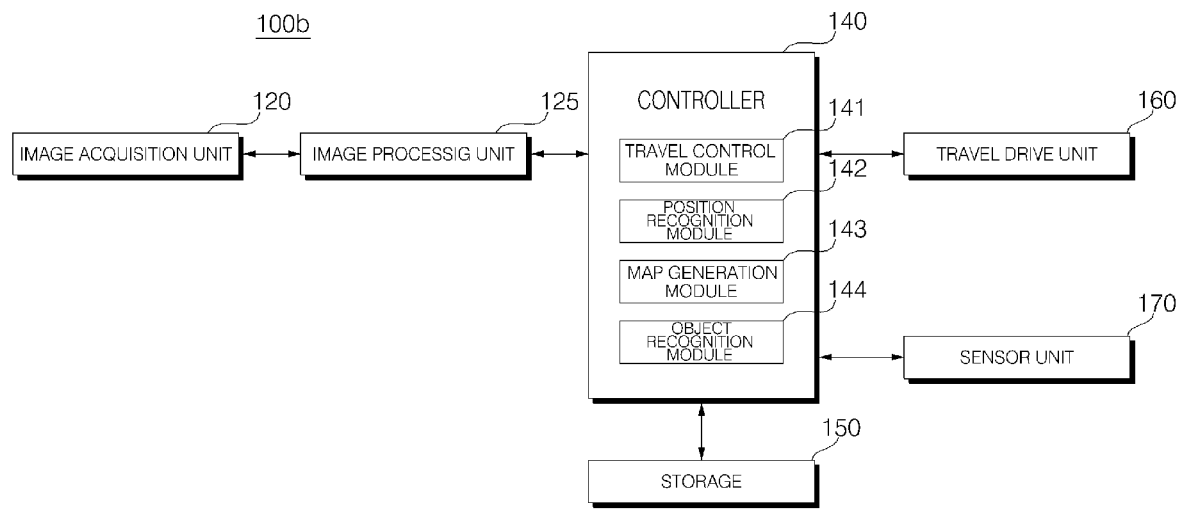

FIGS. 6 and 7 are block diagram of a control relationship between major components of a mobile robot according to an embodiment of the present invention.

Referring to FIGS. 2 to 7, a mobile robot 100, 100a, or 100b includes a main body 110, and an image acquisition unit 120, 120a, and 120b for acquiring an area around the main body 110.

Hereinafter, each part of the main body 110 is defined as below: a portion facing a ceiling of a cleaning area is defined as the top section (see FIG. 3), a portion facing a floor of the cleaning area is defined as the bottom section (see FIG. 5), and a portion facing a direction of travel in portions constituting a circumference of the main body 110 between the top section and the bottom section is defined as the front section (see FIG. 4).

The mobile robot 100, 100a, or 100b includes a travel drive unit 160 for moving the main body 110. The travel drive unit 160 includes at least one drive wheel 136 for moving the main body 110. The travel drive unit 160 includes a driving motor (not shown) connected to the drive wheel 136 to rotate the drive wheel. Drive wheels 136 may be provided on the left side and the right side of the main body 110, respectively, and such drive wheels 136 are hereinafter referred to as a left wheel 136(L) and a right wheel 136(R), respectively.

The left wheel 136(L) and the right wheel 136(R) may be driven by one driving motor, but, if necessary, a left wheel drive motor to drive the left wheel 136(L) and a right wheel drive motor to drive the right wheel 136(R) may be provided. The travel direction of the main body 110 may be changed to the left or to the right by making the left wheel 136(L) and the right wheel 136(R) have different rates of rotation.

A suction port 110h to suction air may be formed on the bottom surface of the body 110, and the body 110 may be provided with a suction device (not shown) to provide suction force to cause air to be suctioned through the suction port 110h, and a dust container (not shown) to collect dust suctioned together with air through the suction port 110h.

The body 110 may include a case 111 defining a space to accommodate various components constituting the mobile robot 100, 110a, 110b. An opening allowing insertion and retrieval of the dust container therethrough may be formed on the case 111, and a dust container cover 112 to open and close the opening may be provided rotatably to the case 111.

There may be provided a roll-type main brush having bristles exposed through the suction port 110h and an auxiliary brush 135 positioned in the front of the bottom surface of the body 110 and having bristles forming a plurality of radially extending blades. Dust is removed from the floor in a cleaning area by rotation of the brushes 134 and 135, and such dust separated from the floor in this way is suctioned through the suction port 110h and collected in the dust container.

A battery 138 serves to supply power necessary not only for the drive motor but also for overall operations of the mobile robot 100, 100a, or 100b. When the battery 138 of the robot cleaner 100 is running out, the mobile robot 100, 100a, or 100b may perform return travel to the charging base 200 to charge the battery, and during the return travel, the robot cleaner 100 may autonomously detect the position of the charging base 200.

The charging base 200 may include a signal transmitting unit (not shown) to transmit a predetermined return signal. The return signal may include, but is not limited to, a ultrasonic signal or an infrared signal.

The mobile robot 100, 100a, or 100b may include a signal sensing unit (not shown) to receive the return signal. The charging base 200 may transmit an infrared signal through the signal transmitting unit, and the signal sensing unit may include an infrared sensor to sense the infrared signal. The mobile robot 100, 100a, or 100b moves to the position of the charging base 200 according to the infrared signal transmitted from the charging base 200 and docks with the charging base 200. By docking, charging of the robot cleaner 100 is performed between a charging terminal 133 of the mobile robot 100, 100a, or 100b and a charging terminal 210 of the charging base 200.

In some implementations, the mobile robot 100, 100a, or 100b may perform return travel to the base station 200 based on an image or in a laser-pattern extraction method.

The mobile robot 100, 100a, or 100b may return to the base station by recognizing a predetermined pattern formed at the base station 200 using an optical signal emitted from the main body 110 and extracting the predetermined pattern.

For example, the mobile robot 100, 100a, or 100b according to an embodiment of the present invention may include an optical pattern sensor (not shown).

The optical pattern sensor may be provided in the main body 110, emit an optical pattern to an active area where the mobile robot 100, 100a, or 100b moves, and acquire an input image by photographing an area into which the optical pattern is emitted. For example, the optical pattern may be light having a predetermined pattern, such as a cross pattern.

The optical pattern sensor may include a pattern emission unit to emit the optical pattern, and a pattern image acquisition unit to photograph an area into which the optical pattern is emitted.

The pattern emission unit may include a light source, and an Optical Pattern Projection Element (OPPE). The optical pattern is generated as light incident from the light source passes through the OPPE. The light source may be a Laser Diode (LD), a Light Emitting Diode (LED), etc.

The pattern emission unit may emit light in a direction forward of the main body, and the pattern image acquisition unit acquires an input image by photographing an area where an optical pattern is emitted. The pattern image acquisition unit may include a camera, and the camera may be a structured light camera.

Meanwhile, the base station 200 may include two or more locator beacons spaced a predetermined distance apart from each other.

A locator beacon forms a mark distinguishable from the surroundings when an optical pattern is incident on a surface of the locator beacon. This mark may be caused by transformation of the optical pattern due to a morphological characteristic of the locator beacon, or may be caused by difference in light reflectivity (or absorptivity) due to a material characteristic of the locator beacon.

The locator beacon may include an edge that forms the mark. An optical pattern incident on the surface of the locator beacon is bent on the edge with an angle, and the bending is found as a cusp in an input image as the mark.

The mobile robot 100, 100a, or 100b may automatically search for the base station when a remaining battery capacity is insufficient, or may search for the base station even when a charging command is received from a user.

When the mobile robot 100, 100a, or 100b searches for the base station, a pattern extraction unit extracts cusps from an input image and a controller 140 acquire location information of the extracted cusps. The location information may include locations in a three-dimensional space, which takes into consideration of distances from the mobile robot 100, 100a, or 100b to the cusps.

The controller 140 calculates an actual distance between the cusps based on the acquired location information of the cusps and compare the actual distance with a preset reference threshold, and, if a distance between the actual distance and the reference threshold falls into a predetermined range, it may be determined that the charging station 200 is found.

Alternatively, the mobile robot 100, 100a, or 100b may return to the base station 200 by acquiring images of the surroundings with a camera of the image acquisition unit 120 and extracting and identifying a shape corresponding to the charging station 200 from the acquired image.

In addition, the mobile robot 100, 100a, or 100b may return to the base station by acquiring images of surroundings with the camera of the image acquisition unit 120 and identifying a predetermined optical signal emitted from the base station 200.

The image acquisition unit 120, which is configured to photograph the cleaning area, may include a digital camera. The digital camera may include at least one optical lens, an image sensor (e.g., a CMOS image sensor) including a plurality of photodiodes (e.g., pixels) on which an image is created by light transmitted through the optical lens, and a digital signal processor (DSP) to construct an image based on signals output from the photodiodes. The DSP may produce not only a still image, but also a video consisting of frames constituting still images.

Preferably, the image acquisition unit 120 includes a front camera 120a provided to acquire an image of a front field of view from the main body 110, and an upper camera 120b provided on the top section of the main body 110 to acquire an image of a ceiling in a travel area, but the position and capture range of the image acquisition unit 120 are not necessarily limited thereto.

In this embodiment, a camera may be installed at a portion (ex. the front, the rear, and the bottom) of the mobile robot and continuously acquire captured images in a cleaning operation. Such a camera may be installed in plural at each portion for photography efficiency. An image captured by the camera may be used to recognize a type of a substance existing in a corresponding space, such as dust, a human hair, and floor, to determine whether cleaning has been performed, or to confirm a point in time to clean.

The front camera 120a may capture an object or a condition of a cleaning area ahead in a direction of travel of the mobile robot 100, 100a, or 100b.

According to an embodiment of the present invention, the image acquisition unit 120 may acquire a plurality of images by continuously photographing the surroundings of the main body 110, and the plurality of acquired images may be stored in a storage 150.

The mobile robot 100, 100a, or 100b may increase accuracy in object recognition by using a plurality of images or may increase accuracy of recognition of an object by selecting one or more images from a plurality of images to use effective data.

In addition, the mobile robot 100, 100a, or 100b may include a sensor unit 170 that includes sensors serving to sense a variety of data related to operation and states of the mobile robot.

For example, the sensor unit 170 may include an object detection sensor to sense an object present ahead. In addition, the sensor unit 170 may further include a cliff detection sensor 132 to sense presence of a cliff on the floor of a travel region, and a lower camera sensor 139 to acquire an image of the floor.

Referring to FIGS. 2 and 4, the object detection sensor 131 may include a plurality of sensors installed at a predetermined interval on an outer circumferential surface of the mobile robot 100.

For example, the sensor unit 170 may include a first sensor disposed on the front surface of the main body 110, and second and third sensors spaced apart from the first sensor in the left and right direction.

The object detection sensor 131 may include an infrared sensor, an ultrasonic sensor, an RF sensor, a magnetic sensor, a position sensitive device (PSD) sensor, etc.

Meanwhile, the positions and types of sensors included in the object detection sensor 131 may differ depending on a model of a mobile robot, and the object detection sensor 131 may further include various sensors.

The object detection sensor 131 is a sensor for sensing a distance to a wall or an object in an indoor space, and is, but not limited thereto, described as an ultrasonic sensor.

The object detection sensor 131 senses an object, especially an object, present in a direction of travel (movement) of the mobile robot and transmits object information to the controller 140. That is, the object detection sensor 131 may sense a protrusion, home stuff, furniture, a wall surface, a wall corner, etc. that are present in a path through which the robot cleaner moves, and deliver related information to a control unit.

In this case, the controller 140 may sense a position of the object based on at least two signals received through the ultrasonic sensor, and control movement of the mobile robot 100 according to the sensed position of the object.

In some implementations, the object detection sensor 131 provided on an outer side surface of the case 110 may include a transmitter and a receiver.

For example, the ultrasonic sensor may be provided such that at least one transmitter and at least two receivers cross one another. Accordingly, it is possible to transmit a signal in various directions and receive a signal, reflected by an object, from various directions.

In some implementations, a signal received from the object detection sensor 131 may go through signal processing, such as amplification and filtering, and thereafter a distance and a direction to an object may be calculated.

Meanwhile, the sensor unit 170 may further include an operation detection sensor that serves to sense operation of the mobile robot 100, 100a, or 100b upon driving of the main body 110, and output operation information. As the operation detection sensor, a gyro sensor, a wheel sensor, an acceleration sensor, etc. may be used.

When the mobile robot 100, 100a, or 100b moves according to an operation mode, the gyro sensor senses a direction of rotation and detects an angle of rotation. The mobile robot 100, 100a, or 100b detects a velocity of the mobile robot 100, 100a, or 100b, and outputs a voltage value proportional to the velocity. The controller 140 may calculate the direction of rotation and the angle of rotation using the voltage value that is output from the gyro sensor.

The wheel sensor is connected to the left wheel 136(L) and the right wheel 136(R) to sense the revolution per minute (RPM) of the wheels. In this example, the wheel sensor may be a rotary encoder. The rotary encoder senses and outputs the RPM of the left wheel 136(L) and the right wheel 136(R).

The controller 140 may calculate the speed of rotation of the left and right wheels using the RPM. In addition, the controller 140 may calculating an angle of rotation using a difference in the RPM between the left wheel 136(L) and the right wheel 136(R).

The acceleration sensor senses a change in speed of the mobile robot 100, 100a, or 100b, e.g., a change in speed according to a start, a stop, a direction change, collision with an object, etc. The acceleration sensor may be attached to a position adjacent to a main wheel or a secondary wheel to detect the slipping or idling of the wheel.

In addition, the acceleration sensor may be embedded in the controller 140 and detect a change in speed of the mobile robot 100, 100a, or 100b. That is, the acceleration sensor detects impulse according to a change in speed and outputs a voltage value corresponding thereto. Thus, the acceleration sensor may perform the function of an electronic bumper.

The controller 140 may calculate a change in the positions of the mobile robot 100, 100a, or 100b based on operation information output from the operation detection sensor. Such a position is a relative position corresponding to an absolute position that is based on image information. By recognizing such a relative position, the mobile robot may enhance position recognition performance using image information and object information.

Meanwhile, the mobile robot 100, 100a, or 100b may include a power supply (not shown) having a rechargeable battery 138 to provide power to the robot cleaner.

The power supply may supply driving power and operation power to each element of the mobile robot 100, 100a, or 100b, and may be charged by receiving a charging current from the charging station 200 when a remaining power capacity is insufficient.

The mobile robot 100, 100a, or 100b may further include a battery sensing unit to sense the state of charge of the battery 138 and transmit a sensing result to the controller 140. The battery 138 is connected to the battery sensing unit such that a remaining battery capacity state and the state of charge of the battery is transmitted to the controller 140. The remaining battery capacity may be disposed on a screen of an output unit (not shown).

In addition, the mobile robot 100, 100a, or 100b includes an operator 137 to input an on/off command or any other various commands. Through the operator 137, various control commands necessary for overall operations of the mobile robot 100 may be received. In addition, the mobile robot 100, 100a, or 100b may include an output unit (not shown) to display reservation information, a battery state, an operation mode, an operation state, an error state, etc.

Referring to FIGS. 6 and 7, the mobile robot 100a, or 100b includes the controller 140 for processing and determining a variety of information, such as recognizing the current position, and the storage 150 for storing a variety of data. In addition, the mobile robot 100, 100a, or 100b may further include a communication unit 190 for transmitting and receiving data with an external terminal.

The external terminal may be provided with an application for controlling the mobile robot 100a and 100b, displays a map of a travel area to be cleaned by executing the application, and designate a specific area on a map to be cleaned. Examples of the external terminal may include a remote control, a PDA, a laptop, a smartphone, a tablet, and the like in which an application for configuring a map is installed.

By communicating with the mobile robot 100a and 100b, the external terminal may display the current position of the mobile robot in addition to the map, and display information on a plurality of areas. In addition, the external terminal may update the current position in accordance with traveling of the mobile robot and displays the updated current position.

The controller 140 controls the image acquisition unit 120, the operator 137, and the travel drive unit 160 of the mobile robot 100a and 100b so as to control overall operations of the mobile robot 100.

The storage 150 serves to record various kinds of information necessary for control of the robot cleaner 100 and may include a volatile or non-volatile recording medium. The recording medium serves to store data which is readable by a micro processor and may include a hard disk drive (HDD), a solid state drive (SSD), a silicon disk drive (SDD), a ROM, a RAM, a CD-ROM, a magnetic tape, a floppy disk, an optical data storage, etc.

Meanwhile, a map of the travel area may be stored in the storage 150. The map may be input by an external terminal or a server capable of exchanging information with the mobile robot 100a and 100b through wired or wireless communication, or may be constructed by the mobile robot 100a and 100b through self-learning.

On the map, positions of rooms within the cleaning area may be marked. In addition, the current position of the mobile robot 100a and 100b may be marked on the map, and the current position of the mobile robot 100a and 100b on the map may be updated during travel of the mobile robot 100a and 100b. The external terminal stores a map identical to a map stored in the storage 150.

The storage 150 may store cleaning history information. The cleaning history information may be generated each time cleaning is performed.

The map of a travel area stored in the storage 150 may be a navigation map used for travel during cleaning, a simultaneous localization and mapping (SLAM) map used for position recognition, a learning map used for learning cleaning by storing corresponding information upon collision with an object or the like, a global localization map used for global localization recognition, an object recognition map where information on a recognized object is recorded, etc.

Meanwhile, maps may be stored and managed in the storage 150 by purposes or may be classified exactly by purposes. For example, a plurality of information items may be stored in one map so as to be used for at least two purposes. For an instance, information on a recognized object may be recorded on a learning map so that the learning map may replace an object recognition map, and a global localization position is recognized using the SLAM map used for position recognition so that the SLAM map may replace or be used together with the global localization map.

The controller 140 may include a travel control module 141, a position recognition module 142, a map generation module 143, and an object recognition module 144.

Referring to FIGS. 3 to 7, the travel control module 141 serves to control travelling of the mobile robot 100, 100a, or 100b, and controls driving of the travel drive unit 160 according to a travel setting. In addition, the travel control module 141 may determine a travel path of the mobile robot 100, 100a, or 100b based on operation of the travel drive unit 160. For example, the travel control module 141 may determine the current or previous moving speed or distance travelled of the mobile robot 100 based on an RPM of the drive wheel 136, and may also determine the current or previous direction shifting process based on directions of rotation of each drive wheel 136(L) or 136(R). Based on travel information of the mobile robot 100, 100a, or 100b determined in this manner, the position of the mobile robot 100, 100a, or 100b on the map may be updated.

The map generation module 143 may generate a map of a travel area. The map generation module 143 may write a map by processing an image acquired by the image acquisition unit 120. That is, a cleaning map corresponding to a cleaning area may be written.

In addition, the map generation module 143 may enable global localization in association with a map by processing an image acquired by the image acquisition unit 120 at each position.

The position recognition module 142 may estimate and recognize the current position. The position recognition module 142 identifies the position in association with the map generation module 143 using image information of the image acquisition unit 120, thereby enabled to estimate and recognize the current position even when the position of the mobile robot 100, 100a, or 100b suddenly changes.

The mobile robot 100, 100a, or 100b may recognize the position using the position recognition module 142 during continuous travel, and the position recognition module 142 may learn a map and estimate the current position by using the map generation module 143 and the object recognition module 144 without the position recognition module 142.

While the mobile robot 100, 100a, or 100b travels, the image acquisition unit 120 acquires images of the surroundings of the mobile robot 100. Hereinafter, an image acquired by the image acquisition unit 120 is defined as an "acquisition image".

An acquisition image includes various features located at a ceiling, such as lighting devices, edges, corners, blobs, ridges, etc.

The map generation module 143 detects features from each acquisition image. In computer vision, there are a variety of well-known techniques for detecting features from an image. A variety of feature detectors suitable for such feature detection are well known. For example, there are Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR, and Grey-level blobs detectors.

The map generation module 143 calculates a descriptor based on each feature. For feature detection, the map generation module 143 may convert a feature into a descriptor using Scale Invariant Feature Transform (SIFT).

The descriptor is defined as a group of individual features present in a specific space and may be expressed as an n-dimensional vector. For example, various features at a ceiling, such as edges, corners, blobs, ridges, etc. may be calculated into respective descriptors and stored in the storage 150.

Based on descriptor information acquired from an image of each position, at least one descriptor is classified by a predetermined subordinate classification rule into a plurality of groups, and descriptors included in the same group may be converted by a predetermined subordinate representation rule into subordinate representative descriptors. That is, a standardization process may be performed by designating a representative value for descriptors obtained from an individual image.

The SIFT enables detecting a feature invariant to a scale, rotation, change in brightness of a subject, and thus, it is possible to detect an invariant (e.g., rotation-invariant) feature of an area even when images of the area is captured by changing a position of the mobile robot 100. However, aspects of the present invention are not limited thereto, and Various other techniques (e.g., Histogram of Oriented Gradient (HOG), Haar feature, Fems, Local Binary Pattern (LBP), and Modified Census Transform (MCT)) can be applied.

The map generation module 143 may classify at least one descriptor of each acquisition image into a plurality groups based on descriptor information, obtained from an acquisition image of each position, by a predetermined subordinate classification rule, and may convert descriptors included in the same group into subordinate representative descriptors by a predetermined subordinate representation rule.

In another example, all descriptors obtained from acquisition images of a predetermined area, such as a room, may be classified into a plurality of groups by a predetermined subordinate classification rule, and descriptors included in the same group may be converted into subordinate representative descriptors by the predetermined subordinate representation rule.

Through the above procedure, the map generation module 143 may obtain a feature distribution for each position. The feature distribution of each position may be represented by a histogram or an n-dimensional vector. In another example, without using the predetermined subordinate classification rule and the predetermined subordinate representation rule, the map generation module 143 may estimate an unknown current position based on a descriptor calculated from each feature.

In addition, when the current position of the mobile robot 100, 100a, or 100b has become unknown due to position hopping, the map generation module may estimate the current position of the mobile robot 100 based on data such as a pre-stored descriptor and a subordinate representative descriptor.

The mobile robot 100, 100a, or 100b acquires an acquisition unit image at the unknown current position using the image acquisition unit 120. Various features located at a ceiling, such as lighting devices, edges, corners, blobs, and ridges, are found in the acquisition image.

The position recognition module 142 detects features from an acquisition image. Descriptions about various methods for detecting features from an image in computer vision and various feature detectors suitable for feature detection are the same as described above.

The position recognition module 142 calculates a recognition descriptor based on each recognition feature through a recognition descriptor calculating process. In this case, the recognition feature and the recognition descriptor are used to describe a process performed by the object recognition module 144, and to be distinguished from the terms describing the process performed by the map generation module 143. However, these are merely terms defined to describe characteristics of a world outside the mobile robot 100, 100a, or 100b.

For such feature detection, the position recognition module 142 may convert a recognition feature into a recognition descriptor using the SIFT technique. The recognition descriptor may be represented by an n-dimensional vector.

The SIFT is an image recognition technique by which easily distinguishable features, such as corners, are selected in an acquisition image and n-dimensional vectors are obtained, which are values of dimensions indicative of a degree of radicalness of change in each direction with respect to a distribution feature (a direction of brightness change and a degree of radicalness of the change) of gradient of pixels included in a predetermined area around each of the features.

Based on information on at least one recognition descriptor obtained from an acquisition image acquired at an unknown current position, the position recognition module 142 performs conversion by a predetermined subordinate conversion rule into information (a subordinate recognition feature distribution), which is comparable with position information (e.g., a subordinate feature distribution for each position) subject to comparison.

By the predetermined subordinate comparison rule, a feature distribution for each position may be compared with a corresponding recognition feature distribution to calculate a similarity therebetween. A similarity (probability) for the position corresponding to each position, and a position having the highest probability may be determined to be the current position.

As such, the controller 140 may generate a map of a travel area consisting of a plurality of areas, or recognize the current position of the main body 110 based on a pre-stored map.

When the map is generated, the controller 140 transmits the map to an external terminal through the communication unit 190. In addition, as described above, when a map is received from the external terminal, the controller 140 may store the map in the storage.

In addition, when the map is updated during traveling, the controller 140 may transmit update information to the external terminal so that the map stored in the external terminal becomes identical to the map stored in the mobile robot 100. As the identical map is stored in the external terminal and the mobile robot 100, the mobile robot 100 may clean a designated area in response to a cleaning command from a mobile terminal, and the current position of the mobile robot may be displayed in the external terminal.

In this case, the map divides a cleaning area into a plurality of areas, includes a connection channel connecting the plurality of areas, and includes information on an object in an area.

When a cleaning command is received, the controller 140 determines whether a position on the map and the current position of the mobile robot match each other. The cleaning command may be received from a remote controller, an operator, or the external terminal.

When the current position does not match with a position marked on the map, or when it is not possible to confirm the current position, the controller 140 recognizes the current position, recovers the current position of the mobile robot 100 and then controls the travel drive unit 160 to move to a designated area based on the current position.

When the current position does not match with a position marked on the map or when it is not possible to confirm the current position, the position recognition module 142 analyzes an acquisition image received from the image acquisition unit 120 and estimate the current position based on the map. In addition, the object recognition module 144 or the map generation module 143 may recognize the current position as described above.

After the current position of the mobile robot 100, 100a, or 100b is recovered by recognizing the position, the travel control module 141 may calculate a travel path from the current position to a designated area and controls the travel drive unit 160 to move to the designated area.

When a cleaning pattern information is received from a server, the travel control module 141 may divide the entire travel area into a plurality of areas based on the received cleaning pattern information and set one or more areas as a designated area.

In addition, the travel control module 141 may calculate a travel path based on the received cleaning pattern information, and perform cleaning while traveling along the travel path.

When cleaning of a set designated area is completed, the controller 140 may store a cleaning record in the storage 150.

In addition, through the communication unit 190, the controller 140 may transmit an operation state or a cleaning state of the mobile robot 100 at a predetermined cycle.

Accordingly, based on the received data, the external terminal displays the position of the mobile robot together with a map on a screen of an application in execution, and outputs information on a cleaning state.

The mobile robot 100, 100a, or 100b moves in one direction until detecting an object or a wall, and, when the object recognition module 144 recognizes an object, the mobile robot 100, 100a, or 100b may determine a travel pattern, such as forward travel and rotational travel, depending on an attribute of the recognized object.

For example, if the attribute of the recognized object implies an object that the mobile robot is able to climb, the mobile robot 100, 100a, or 100b may keep traveling forward. Alternatively, if the attribute of the recognized object implies an object that the mobile robot is not able to climb, the mobile robot 100, 100a, or 100b may travel in a zigzag pattern in a manner in which the mobile robot 100, 100a, or 100b rotates, moves a predetermined distance, and then moves a distance in a direction opposite to the initial direction of travel until detecting another object.

The mobile robot 100, 100a, or 100b may perform object recognition and avoidance based on machine learning.

The controller 140 may include the object recognition module 144 for recognizing an object, which is pre-learned through machine learning, in an input image, and the travel control module 141 for controlling driving of the travel drive unit 160 based on an attribute of the recognized object.

The mobile robot 100, 100a, or 100b may include the object recognition module 144 that has learned an attribute of an object through machine learning.

The machine learning refers to a technique which enables a computer to learn without a logic instructed by a user so as to solves a problem on its own.

Deep learning is an artificial intelligence technology that trains a computer to learn human thinking based on Artificial Neural Networks (ANN) for constructing artificial intelligence so that the computer is capable of learning on its own without a user's instruction.

The ANN may be implemented in a software form or a hardware form, such as a chip and the like.

The object recognition module 144 may include an ANN in a software form or a hardware form, in which attributes of objects is learned.

For example, the object recognition module 144 may include a Depp Neural Network (DNN) trained through deep learning, such as Convolutional Neural Network (CNN), Recurrent Neural Network (RNN), Deep Belief Network (DBN), etc.

Deep learning will be described in more detail with reference to FIGS. 9 to 12.

The object recognition module 144 may determine an attribute of an object in input image data based on weights between nodes included in the DNN.

Meanwhile, when the sensor unit 170 senses an object while the mobile robot 100, 100a, or 100b moves, the controller 140 may perform control to select, based on a moving direction and a moving speed of the main body 110, an image acquired at a specific point in time earlier than an object sensing time by the sensor unit 170 from among a plurality of continuous images acquired by the image acquisition unit 120.

In the case where the image acquisition unit 120 acquires an image using an object sensing time of the sensor unit 170 as a trigger signal, an object may not be included in the acquired image or may be captured in a very small size because the mobile robot keeps moving.

Thus, in one embodiment of the present invention, it is possible to select, based on a moving direction and a moving speed of the main body 110, an image acquired at a specific point in time earlier than an object sensing time of the sensor unit 170 from among a plurality of continuous images acquired by the image acquisition unit 120 and use the selected as data for object recognition.

Meanwhile, the object recognition module 144 may recognize an attribute of an object included in the selected image acquired at the predetermined point in time, based on data that is pre-learned through machine learning.

In addition, when the sensor unit 170 senses an object while the mobile robot 100, 100a, or 100b moves, the controller 140 may perform control to extract part of an image acquired by the image acquisition unit 120 in correspondence to a direction in which the object sensed by the sensor unit 170 is present.

The image acquisition unit 120, especially the front camera 120a, may acquire an image within a predetermined range of angles in a moving direction of the mobile robot 100, 100a, or 100b.

The controller 140 may distinguish an attribute of the object present in the moving direction, not by using the whole image acquired by the image acquisition unit, especially the front camera 120a, but by using only a part of the image.

Referring to FIG. 6, the controller 140 may further include an image processing module 145 for extracting a part of an image acquired by the image acquisition unit 120 in correspondence to a direction in which an object sensed by the sensor unit 170 is present.

Alternatively, referring to FIG. 7, the mobile robot 100b may further include an additional image processing unit 125 for extracting a part of an image acquired by the image acquisition unit 120 in correspondence to a direction in which an object sensed by the sensor unit 170 is present.

The mobile robot 100a in FIG. 6 and the mobile robot 100b in FIG. 7 are identical to each other, except for the image processing module 145 and the image processing unit 125.

Alternatively, in some implementations, the image acquisition unit 120 may extract a part of the image on its own, unlike the examples of FIGS. 6 and 7.

The object recognition module 144 having trained through machine learning has a higher recognition rate if a learned object occupies a larger portion of input image data.

Accordingly, the present invention may extract a different part of an image acquired by the image acquisition unit 120 depending on a direction in which an object sensed by the sensor unit 170 such as an ultrasonic sensor, and use the extracted part of the image as data for recognition, thereby enhancing a recognition rate.

The object recognition module 144 may recognize an object in the extracted part of the image, based on data that is pre-learned through machine learning.

In addition, the travel control module 141 may control driving of the travel drive unit 160 based on an attribute of the recognized object.

Meanwhile, when the object is sensed from a forward-right direction of the main body, the controller 140 may perform control to extract a right lower area of the image acquired by the image acquisition unit; when the object is sensed from a forward-left direction of the main body, the controller 140 may perform control to extract a left lower area of the image acquired by the image acquisition unit; and when the object is sensed from a forward direction of the main body, the controller 140 may perform control to extract a central lower area of the image acquired by the image acquisition unit.

In addition, the controller 140 may perform control to shift an extraction target area of an image acquired by the image acquisition unit to correspond to a direction in which the sensed object is present, and then extract the extraction target area.

Meanwhile, input data for distinguishing an attribute of an object, and data for training the DNN may be stored in the storage 150.

An original image acquired by the image acquisition unit 120, and extracted images of a predetermined area may be stored in the storage 150.

In addition, in some implementations, weights and biases of the DNN may be stored in the storage 150.

Alternatively, in some implementations, weights and biases of the DNN may be stored in an embedded memory of the object recognition module 144.

Meanwhile, whenever a part of an image acquired by the image acquisition unit 120 is extracted, the object recognition module 144 may perform a learning process using the extracted part of the image as training data, or, after a predetermined number of images is extracted, the object recognition module 144 may perform a learning process.

That is, whenever an object is recognized, the object recognition module 144 may add a recognition result to update a DNN architecture, such as a weight, or, when a predetermined number of training data is secured, the object recognition module 144 may perform a learning process using the secured data sets as training data so as to update an DNN architecture.

Alternatively, the mobile robot 100, 100a, or 100b transmits an original image acquired by the image acquisition unit 120 or an extracted part of the image to a predetermined server through the communication unit 190, and receive machine learning-related data from the predetermined server.

In this case, the mobile robot 100, 100a, or 100b may update the object recognition module 141 based on the machine learning-related data received from the predetermined server.

Figure 8:
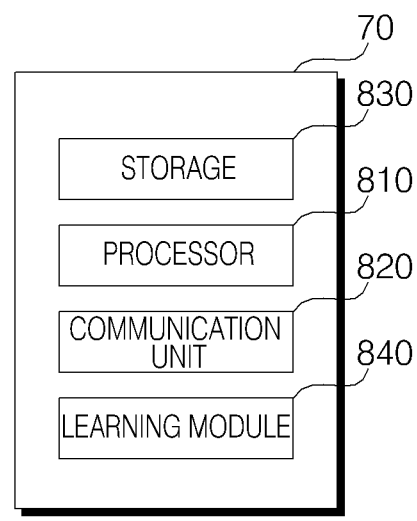
FIG. 8 is an exemplary schematic internal block diagram of a server according to an embodiment of the present invention.

FIG. 8 is an exemplary schematic internal block diagram of a server according to an embodiment of the present invention.

Referring to FIG. 8, a server 70 may include a communication unit 820, a storage 830, a learning module 840, and a processor 810.

The processor 810 may control overall operations of the server 70.

Meanwhile, the server 70 may be a server operated by a manufacturer of a home appliance such as the mobile robot 100, 100a, or 100b, a server operated by a service provider, or a kind of Cloud server.

The communication unit 820 may receive a diversity of data, such as state information, operation information, controlled information, etc., from a mobile terminal, a home appliance such as the mobile robot 100, 100a, or 100b, etc., a gate way, or the like.

In addition, the communication unit 820 may transmit data responsive to the received diversity of data to a mobile terminal, a home appliance such as the mobile robot 100, 100a, 100b, etc., a gate way or the like.

To this end, the communication unit 820 may include one or more communication modules such as an Internet module, a communication module, etc.

The storage 830 may store received information and data necessary to generate result information responsive to the received information.

In addition, the storage 830 may store data used for learning machine, result data, etc.

The learning module 840 may serve as a learning machine of a home appliance such as the mobile robot 100, 100a, or 100b, etc.

The learning module 840 may include an artificial network, for example, a Deep Neural Network (DNN) such as a Convolutional Neural Network (CNN), a Recurrent Neural Network (RNN), a Deep Belief Network (DBN), etc., and may train the DNN.

As a learning scheme for the learning module 840, both unsupervised learning and supervised learning may be used.

Meanwhile, according to a setting, the controller 810 may perform control to update an artificial network architecture of a home appliance such as the mobile robot 100, 100a, or 100b, into a learned artificial neural network architecture.

FIGS. 9 to 12 are diagrams for explanation of deep learning.

Deep learning is a kind of machine learning, and goes deep inside data in multiple stages.

The deep learning may represent a set of machine learning algorithms that extract more critical data from a plurality of data sets on each layer than on the previous layer.

Deep learning architectures may include an ANN and may be, for example, composed of a DNN such as a Convolutional Neural Network (CNN_, a Recurrent Neural Network (RNN), a Deep Belief Network (DBN), etc.

Figure 9:
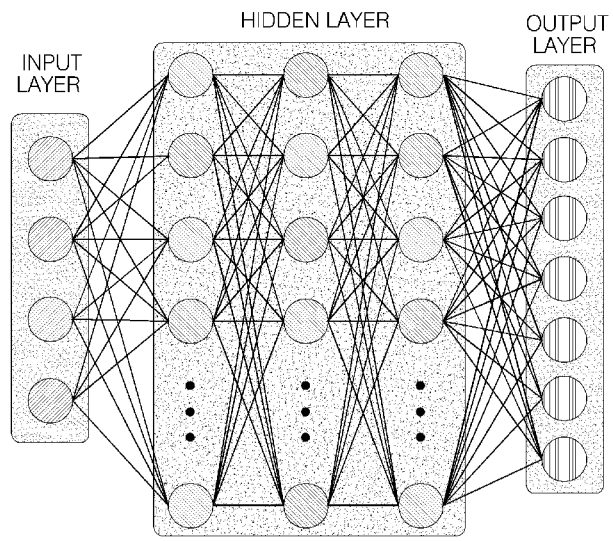
FIGS. 9 to 12 are diagrams for explanation of deep learning.

Referring to FIG. 9, the ANN may include an input layer, a hidden layer, and an output layer. Each layer includes a plurality of nodes, and each layer is connected to a subsequent layer. Nodes between adjacent layers may be connected to each other with having weights.

Figure 10:
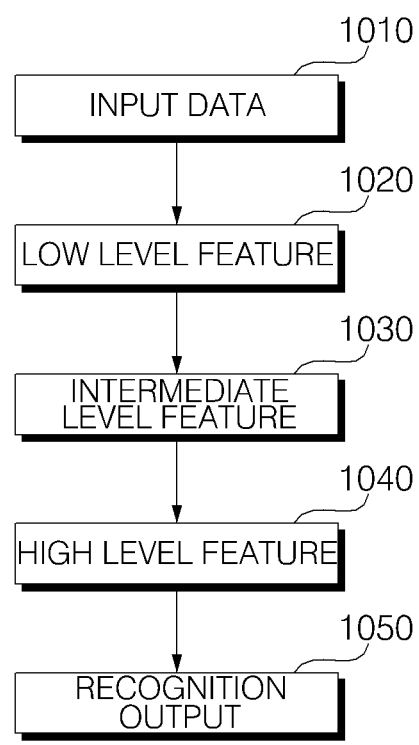

Referring to FIG. 10, a computer (machine) constructs a feature map by discovering a predetermined pattern from input data 1010. The computer (machine) may recognize an object by extracting a low level feature 1020 through an intermediate level feature 1030 to an upper level feature 1040, and output a corresponding result 1050.

The ANN may abstract a higher level feature on a further subsequent layer.

Referring to FIGS. 9 and 10, each node may operate based on an activation model, and an output value corresponding to an input value may be determined according to the activation model.

An output value of a random node, for example, the low level feature 1020, may be input to a subsequent layer connected to the corresponding node, for example, a node of the intermediate level feature 1030. The node of the subsequent layer, for example, the node of the intermediate level feature 1030, may receive values output from a plurality of nodes of the lower level feature 1020.

At this time, a value input to each node may be an output value of a previous layer with a weight applied. A weight may refer to strength of connection between nodes.

In addition, a deep learning process may be considered a process for determining an appropriate weight.

Meanwhile, an output value of a random node, for example, the intermediate level feature 1030, may be input to a node of a subsequent layer connected to the corresponding node, for example, a node of the higher level feature 1040. The node of the subsequent layer, for example, the node of the higher level feature 1040, may receive values output from a plurality of nodes of the intermediate level feature 1030.

The ANN may extract feature information corresponding to each level using a trained layer corresponding to each level. The ANN may perform abstraction sequentially such that a predetermined object may be recognized using feature information of the highest layer.

For example, face recognition with deep learning is as follows: a computer may classify bright pixels and dark pixels by degrees of brightness from an input image, distinguish simple forms such as boundaries and edges, and then distinguish more complex forms and objects. Lastly, the computer may recognize a form that defines a human face.

A deep learning architecture according to the present invention may employ a variety of well-known architectures. For example, the deep learning architecture may be a CNN, RNN, DBN, etc.

The RNN is widely used in processing natural languages and efficient in processing time-series data, which changes over time, and thus, the RNN may construct an artificial neural network architecture by piling up layers each time.

The DBN is a deep learning architecture that is constructed by piling up multiple layers of Restricted Boltzman Machine (RBM) which is a deep learning technique. If a predetermined number of layers is constructed by repeating RBM learning, a DBN having the predetermined number of layers may be constructed.

The CNN is an architecture widely used especially in object recognition and the CNN will be described with reference to FIGS. 11 and 12.

The CNN is a model that imitates human brain functions based on an assumption that a human extracts basic features of an object, performs complex calculation on the extracted basic features, and recognizes the object based on a result of the calculation.

Figure 11:
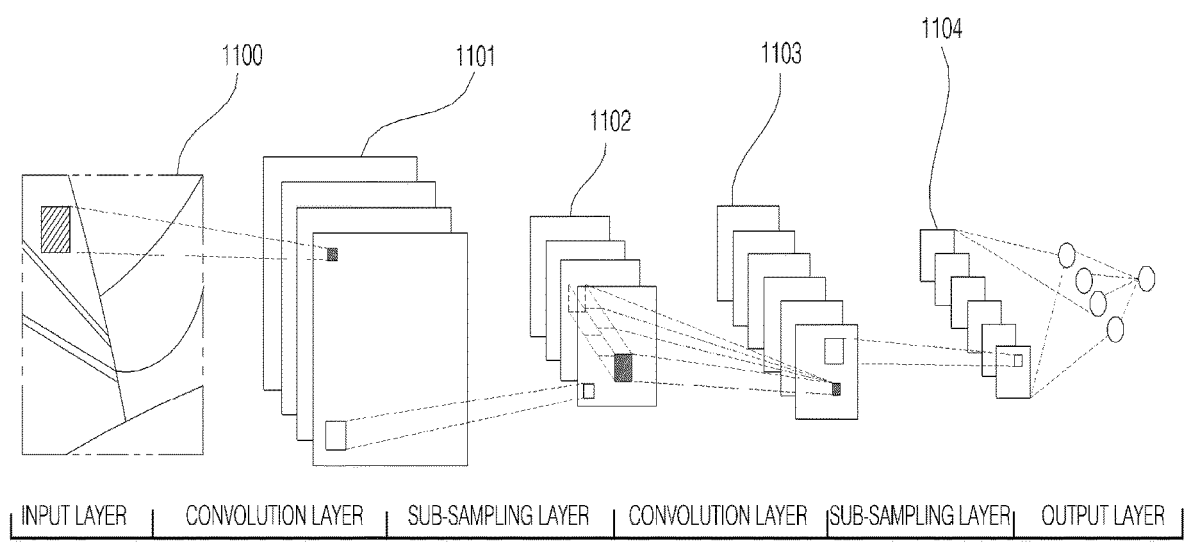

FIG. 11 is a diagram of a CNN architecture.

A CNN may also include an input layer, a hidden layer, and an output layer.

A predetermined image is input to the input layer.

Referring to FIG. 11, the hidden layer may be composed of a plurality of layers and include a convolutional layer and a sub-sampling layer.

In the CNN, a pooling or non-linear activation function is used to add non-linear features and various filters so as to basically extract features of an image through convolution computation.

Convolution is mainly used in filter computation in image processing fields and used to implement a filter for extracting a feature from an image.

Figure 12:
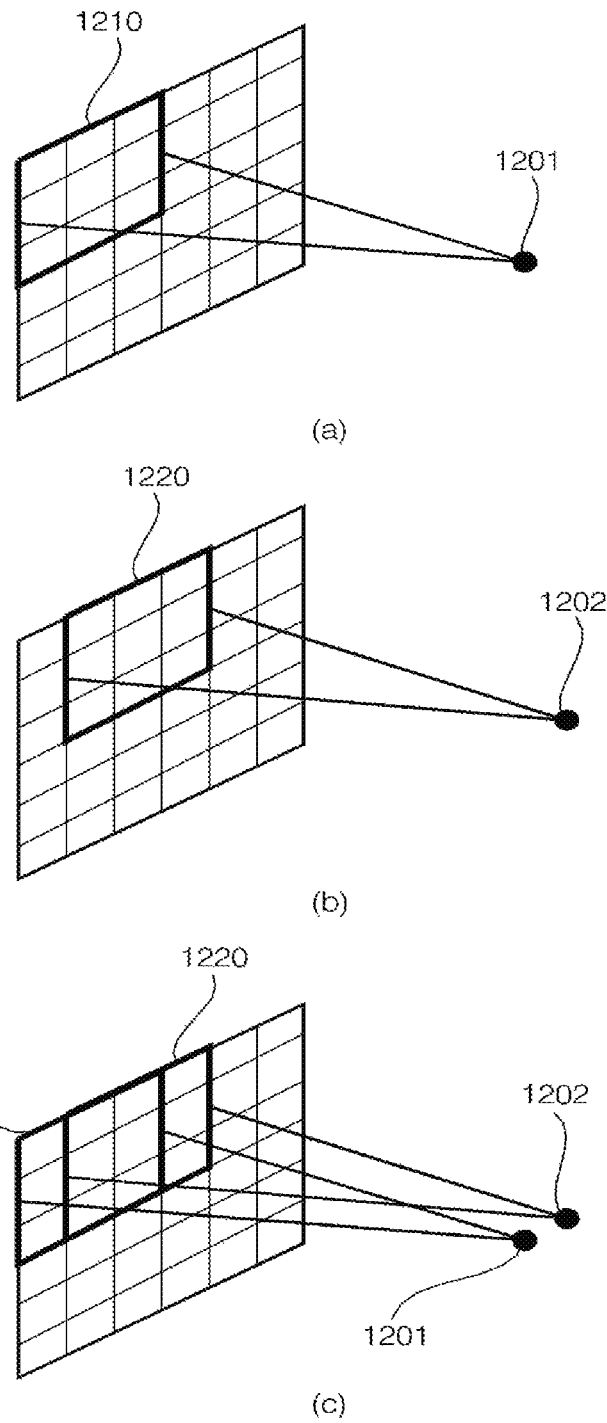

For example, as in FIG. 12, if convolution computation is repeatedly performed with respect to the entire image by moving a 3×3 window, an appropriate result may be obtained according to a weight of the window.

Referring to (a) of FIG. 12, if convolution computation is performed with respect to a predetermined area 1210 using a 3×3 window, a result 1201 is outcome.

Referring to (b) of FIG. 12, if computation is performed again with respect to an area 1220 by moving the 3×3 window to the right, a predetermined result 1202 is outcome.

That is, as shown in (c) of FIG. 12, if computation is performed with respect to an entire image by moving a predetermined window, a final result may be obtained.

A convolution layer may be used to perform convolution filtering for filtering information extracted from a previous layer with a filter of a predetermined size (for example, a 3×3 window exemplified in FIG. 12).

The convolutional layer performs convolutional computation on input image data 1100 and 1102 with a convolutional filter, and generates feature maps 1101 and 1103 representing features of an input image 1100.

As a result of convolution filtering, filtered images in the same number of filters included in the convolution layer may be generated. The convolution layer may be composed of nodes included in the filtered images.

In addition, a sub-sampling layer paired with a convolution layer may include feature maps in the same number as feature maps of the paired convolutional layer.

The sub-sampling layer reduces dimension of the feature maps 1101 and 1103 through sampling or pooling.

The output layer recognizes the input image 1100 by combining various features represented in a feature map 1104.

An object recognition module of a mobile robot according to the present invention may employ the aforementioned various deep learning architectures. For example, a CNN widely used in recognizing an object in an image may be employed, but aspects of the present invention are not limited thereto.

Meanwhile, training of an ANN may be performed by adjusting a weight of a connection line between nodes so that a desired output is output in response to a given input. In addition, the ANN may constantly update the weight due to the training. In addition, back propagation or the like may be used to train the ANN.

FIGS. 13 and 14 are diagrams for explanation of object recognition of the object recognition module 144.

Referring to FIG. 13, the object recognition module 144 may classify objects into classes such as a fan, a home theater, a multi plug, a lamp base, a human hair, a bump, etc., and recognize the objects in a distinguishable manner.

In addition, the object recognition module 144 may classify the classes such as a fan, a home theater, a multi plug, a lamp base, a human hair, etc. as a dangerous object super-class which is a higher conceptual level, and may recognize the object in a distinguishable manner.

In addition, the object recognition module 144 may classify an object, such as a bump and the like, which the mobile robot is able to travel forward, as a non-dangerous object super-class and recognize the object in a distinguishable manner.

Referring to (a) of FIG. 14, the object recognition module 144 may recognize an input image and obtain a recognition result indicative of a fan with a confidence of 0.95 and a recognition result indicative of a home theater with a confidence of 0.7. In this case, the object recognition module 144 may output the fan, which is a recognition result having a higher confidence of 0.7, as a recognition result with respect to the input image.

Meanwhile, a confidence may be normalized within a range from 0.0 to 1.0.

Referring to (b) of FIG. 14, the object recognition module 144 may recognize an input image and obtain a recognition result indicative of a fan with a confidence of 0.35 and a recognition result indicative of a home theater with a confidence of 0.4.

For example, in the case where it is set to ignore a confidence of 0.6 or less, the object recognition module 144 may not select any specific recognition result because the two recognition results are lower than a reference threshold, and the object recognition module 144 may determine unknown data.

Referring to (c) of FIG. 14, the object recognition module 144 may recognize an input image and obtain a recognition result indicative of a fan with a confidence of 0.95 and a recognition result indicative of a home theater with a confidence of 0.9.

For example, in the case where it is set to select a recognition result with a confidence of 0.9 or higher as a final recognition result, the object recognition module 144 may not select any specific recognition result because the two recognition results are higher than a reference threshold, and thus, the object recognition module 144 may determine an object as a dangerous object which is a higher conceptual level.

Alternatively, in the case where it is set to confirm a higher recognition result when a difference between confidences is 0.15 or higher, the object may be determined as a dangerous object that is a higher conceptual level.

Meanwhile, even in the case where an object is determined as a dangerous object, the travel control module 141 may control the travel drive unit 160 so as to move while detouring around the dangerous object.

Figure 15:
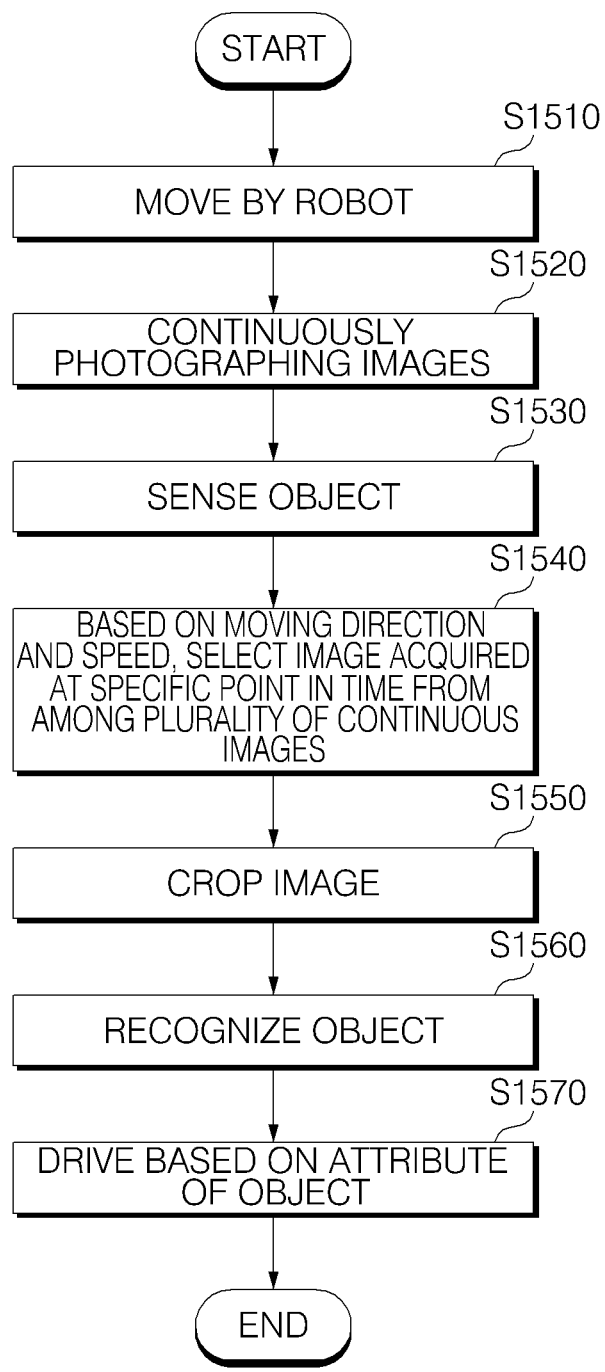
FIG. 15 is a flowchart of a method for controlling a mobile robot according to an embodiment of the present invention.

FIG. 15 is a flowchart of a method for controlling a mobile robot according to an embodiment of the present invention.

Referring to FIGS. 2 to 7 and 15, the mobile robot 100, 100a, or 100b may perform cleaning while moving according to a command or a setting (S1510).

Meanwhile, the image acquisition unit 120 may acquire a plurality of images by continuously photographing the surroundings of the main body 110 during traveling (S1520). The plurality of continuous images acquired by the image acquisition unit 120 may be stored in the storage 150.

When an object is sensed by the sensor unit 170 during movement (S1530), the controller 140 may select an image acquired at a specific point in time earlier than an object sensing time of the sensor unit 170 from among the plurality of continuous images (S1540) based on a moving direction and a moving speed of the main body 110.

The moving direction and the moving speed may be calculated by the travel control module 141 or the like based on an output from an operation detection sensor of the sensor unit 170.

Meanwhile, in the case where the mobile robot is set to travel at a reference speed in normal travel, the moving speed is constant, and thus, it is possible to select an image acquired at a specific point in time by determining a moving direction of the main body 110.

Meanwhile, in the case where the moving direction corresponds to forward travel or rotational travel at an angle smaller than a predetermined reference threshold (reference angle), the controller 140 may select an image acquired at a specific point in time earlier than the object sensing time of the sensor unit 170 from the plurality of continuous images.

In general, a sensing range of a sensor such as an ultrasonic sensor is greater than a photographing range of a camera.

Accordingly, in the case where an image is acquired in response to a signal indicative of sensing of an object by the sensor unit 170, the mobile robot is still traveling and thus the acquired image may not include features of the object. In addition, in the case where a sensing range of the sensor unit 170 is short, an acquired image is more likely not to include features of an object.

Accordingly, in the case of forward travel or approximately forward travel, the controller 140 may select an image acquired at a specific point in time earlier than the object sensing time of the sensor unit 170 based on a moving direction and a moving speed.

In this case, if the moving speed is slower, the controller 140 may select an image acquired at a point in time further earlier than the object sensing time of the sensor unit 170.

If the moving speed is faster, the mobile robot 100 travels a longer distance after the object sensing time of the sensing time 170. In other words, when the image acquisition unit 120 acquires a plurality of images at a constant speed, the mobile robot travels a longer distance during a period of time between a point in time to capture a specific frame and a point in time to capture a subsequent frame.

Therefore, as a moving speed is faster the probability that an area occupied by an object in an image is large is higher when the image at the point in time closer to an object sensing time of the sensor unit 170 is selected.

In contrast, as a moving speed decreases, the image acquisition unit 120 acquires more images while traveling the same distance, and thus, it may be preferable to select an image captured at a point in time further earlier than an object sensing time of the sensor unit 170.

The object recognition module 144 may select the image acquired at the specific point in time, and use the image as input data for recognition of the object.

Meanwhile, the object recognition module 144 trained through the machine learning exhibits a higher recognition rate if a learned object occupies a higher proportion of input image data.

Thus, the controller 140 may perform control to crop part of the selected image acquired at the specific point in time in correspondence to a direction in which an object sensed by the sensor unit 170 is present, and to extract the cropped part (S1550).

As a different part is extracted from an image acquired by the image acquisition unit 120 depending on a direction in which an object sensed by the sensor unit 170 is present, and the extracted part of the image is used as data for recognition, a recognition rate may be enhanced.

The object recognition module 144 may recognize an attribute of the object included in an image of the part extracted from the selected image acquired at the specific point in time (S1560).

The object recognition module 144 may include an ANN having trained to recognize attributes such as types of objects through machine learning, and may recognize an attribute of an object included in an image of a part extracted from the selected image acquired at the specific point in time based on data that is pre-learned through machine learning (S1560).

For example, a CNN, which is one of deep learning architectures, may be embedded in the object recognition module 144, and a pre-trained CNN may recognize an attribute of an object included in input data and output a result of the recognition.

Meanwhile, by performing the aforementioned object recognition process repeatedly and achieving a final recognition result based on a plurality of recognition results, it is possible to further enhance recognition accuracy.

For example, the controller 140 may store position information of a sensed object and position information of the mobile robot in the storage 150, and perform control such that an area of a predetermined size around the position of the sensed object is registered as an object area in a map.

Thereafter, whenever the mobile robot passes the registered object area, an attribute of the object may be recognized and a final attribute of the object may be determined based on the plurality of recognition results.

The controller 140 may recognize an attribute of an object sequentially with respect to images acquired by the image acquisition unit 120 in a predetermined object area, and determine a final attribute of the object based on such a plurality of recognition results of the sequential recognition. This embodiment will be described in more detail with reference to FIGS. 29 to 34.

Meanwhile, the travel control module 141 may control driving of the travel drive unit 160 based on the recognized attribute of the object (S1570).

For example, if the recognized object is an object having a height that the mobile robot 100 is able to climb, the travel control module 141 may perform control to travel while detouring around the object.

In addition, if the recognized object is an object, such as a low bump, having a height that the mobile robot 100 is able to climb, such as a low door threshold, the travel control module 141 may perform control to keep traveling in a forward direction.

In addition, if an object is recognized as an object that can restrict the mobile robot 100 during traveling even though the object is a low height object such as a fan base, a human hair, a multi plug, an electric wire, etc., the travel control module 141 may perform control to travel while detouring around the object.

Figure 16:
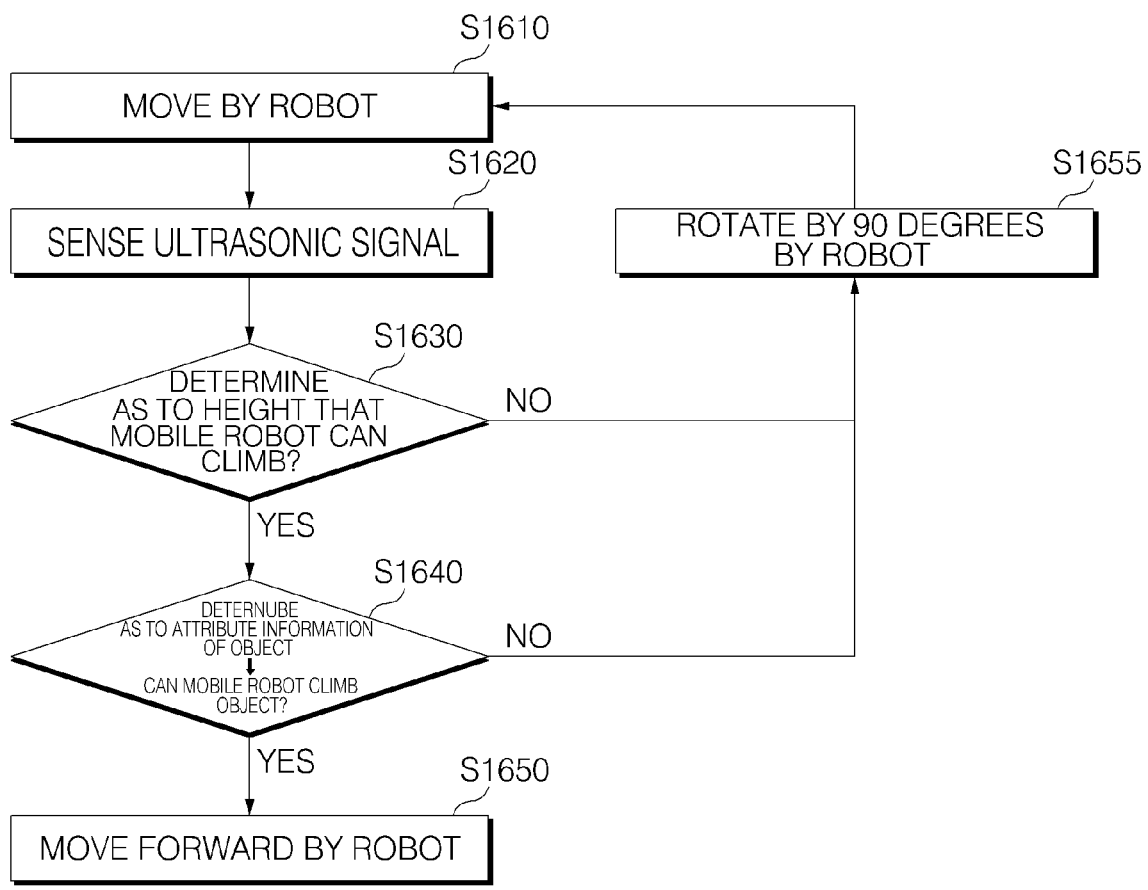
FIG. 16 is a flowchart of a method for controlling a mobile robot according to an embodiment of the present invention.

FIG. 16 is a flowchart of a method for controlling a mobile robot according to an embodiment of the present invention.

Referring to FIGS. 2 to 7 and 16, the mobile robot 100, 100a, or 100b may move according to a command or a setting (S1610).

In the case where the sensor unit 170 includes an ultrasonic sensor, the sensor unit 170 may sense an object in response to sensing of a reflected ultrasonic signal (S1620).

Meanwhile, the image acquisition unit 120 may acquire a plurality of images by constantly photographing the front area and surroundings of the mobile robot 100, 100a, or 100b.

The controller 140 may select an image acquired at a predetermined previous point in time from among a plurality of images acquired by the image acquisition unit 120 in consideration of a moving direction and a moving speed, and determine, on the basis of data that is pre-learned through machine learning, an attribute of an object sensed in the selected image acquired at the specific point in time.

In addition, the controller 140 may determine whether the sensed object has a height that the mobile robot 100 is able to climb (S1630).

If the recognized object is an object having a height that the mobile robot is not able to climb (S1630), the controller 140 may perform control to travel while detouring the object by rotating by 90 degrees (S1655).

Meanwhile, if the recognized object is an object having a height that the mobile robot is able to climb (S1630), the controller 140 may determine attribute information of the sensed object (S1640). That is, the controller 140 may determine whether the recognized object is less likely to restrict the mobile robot and thus considered an object that the mobile robot 100 is able to climb.

If the recognized object is determined as an object that the mobile robot is able to climb, the controller 140 may perform control to keep moving forward (S1650).

Conventionally, whether a sensed object has a height that a mobile robot is able to climb is determined, and, when the sensed object is an object having a low height, the mobile robot moves forward.

However, when an object such as an electric wire is present, a mobile robot is sometimes caught and thus restricted by the electric wire.

In addition, the mobile robot may try to escape from the restricted state by performing a motion of shaking to the left/right, but this may lead to an accident, for example, peeling off of the electric wire.

However, the present invention recognizes object attribute information with learning machine and image information and determines a travel pattern depending on a recognized object attribute, thereby enhancing reliability.

FIGS. 17 to 25 are diagrams for explanation of a method for controlling a mobile robot according to an embodiment of the present invention.

Figure 17:
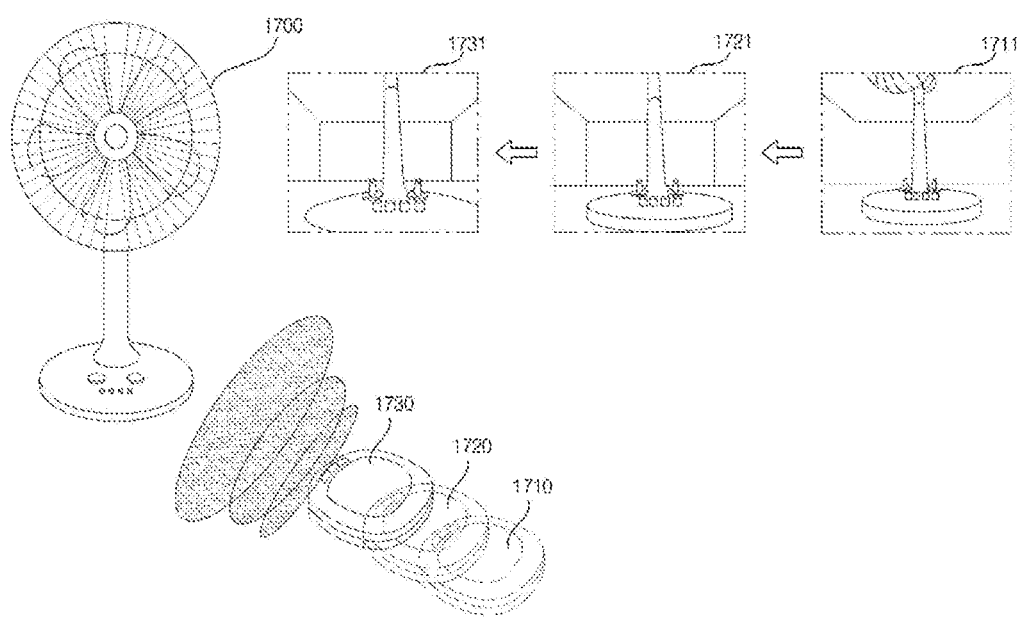
FIGS. 17 to 25 are diagrams for explanation of a method for controlling a mobile robot according to an embodiment of the present invention.

FIG. 17 shows the case where an object 1700 is sensed from a forward direction of the mobile robot 100.

Referring to FIG. 17, the image acquisition unit 120 may acquire a plurality of images by continuously photographing while the mobile robot 100 travels. The mobile robot 100 may acquire a first image 1711 at a first position 1710, a second image 1721 at a second position 1720, and a third image 1731 at a third position 1730.

Figure 18:
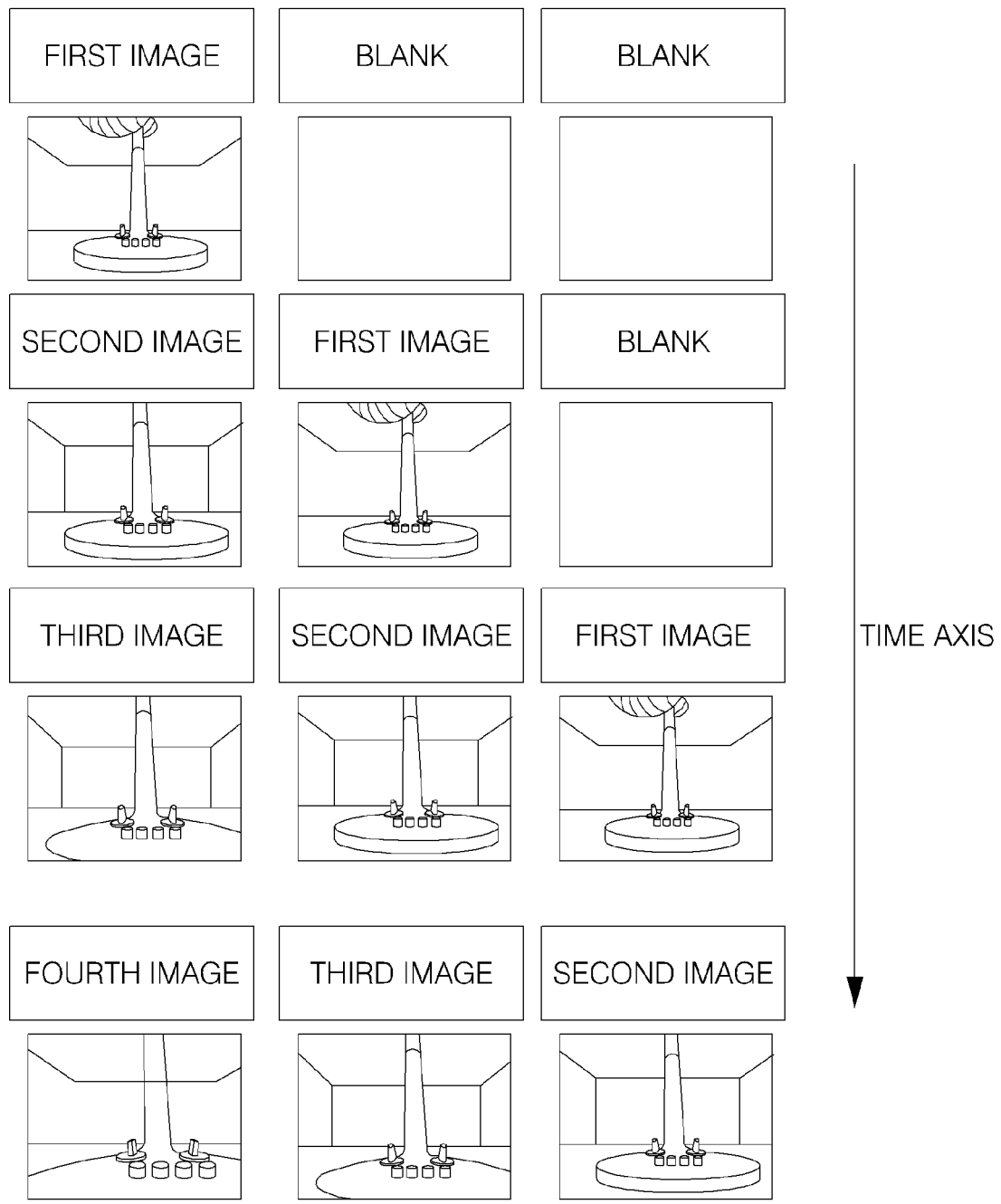

Referring to FIG. 18, a predetermined number of images may be stored in the storage 150. In addition, if a preset number of images is acquired, an image acquired at the earliest point in time may be deleted and a newly acquired image may be stored.

The mobile robot 100 may start an image recognition processing in accordance with a trigger signal responsive to sensing an ultrasonic signal.

However, since an ultrasonic sensor has a short range, a feature of a recognition subject may not be found in the image 1731 acquired Thus, the present invention may store continuous images in the storage 150, determine whether a direction of travel is a forward direction, and perform an object recognition process not using the third image 1731 acquired at the trigger event, but using the first image 1711.

Since the mobile robot 100 travels at a constant speed most of times, it is possible to perform an object recognition process simply by determining whether the mobile robot 100 is traveling forward, and by selecting an image acquired at a specific point in time, for example, a previous image two frames earlier than an object sensing time of the sensor unit 170.

In addition, by taking into consideration even a sensing range of the sensor unit 170, performance, and a processing speed of the object recognition process, the controller 140 may determine how much earlier a previous image is selected compared to the object sensing time of the sensor unit 170.

Meanwhile, in some embodiments, by using only a part of the image acquired at the selected point in time, rather than the entire image, as input data for object recognition, it is possible to enhance a recognition rate.

In this embodiment, it is possible to extract the center area, the left area, and the right area of an image based on a direction in which an object is sensed, rather than cropping an area of a predetermined size around the center area of the image.

For example, when the object is sensed from a forward-right direction of the main body, a right lower area of the image acquired at the selected point in time may be extracted; when the object is sensed from a forward-left direction of the main body, a left lower area of the image acquired at the selected point in time may be extracted; and when the object is sensed from a forward direction of the main body, a central lower area of the image acquired at the selected point in time may be extracted.

Accordingly, objects as many as possible may be included in input data for recognition. Since a machine recognizes what occupies the largest proportion of an image, it is possible to enhance a rate of recognition of an object attribute.

Figure 19:
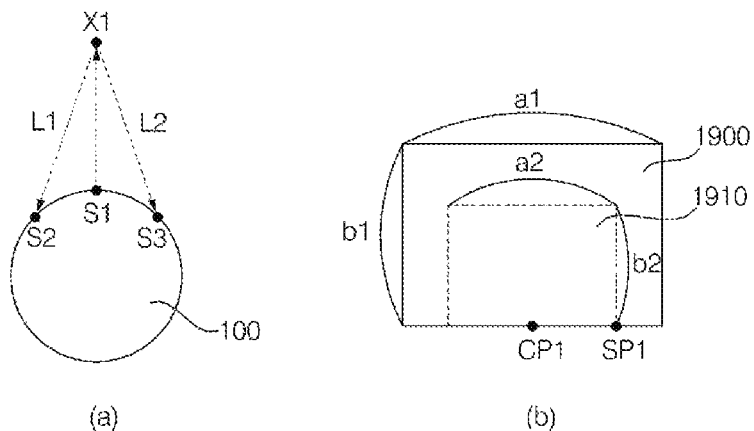

Referring to (a) of FIG. 19, the sensor unit 170 according to an embodiment of the present invention may include a first sensor S1 disposed on the front surface of the main body of the mobile robot, and a second sensor S2 and a third sensor S3 respectively spaced apart from the first sensor S1 in the left and right direction.

In this case, the first sensor S1 may operate as a transmitter, and the second sensor S2 and the third sensor S3 may operate as a receiver. For example, the first sensor S1 may transmit an ultrasonic signal, and the second sensor S2 and the third sensor S3 may receive a signal reflected by an object. If the signal reflected by the object is received, it is possible to determine a direction in which the object is present and a distance to the object with well-known recognition methods using ultrasound.

The drawing (a) of FIG. 19 shows an example in which an object X1 is sensed at the center from a forward direction of the mobile robot 100. If a distance L1 from the sensed object X1 to the second sensor S2 and a distance L2 from the sensed object X1 to the third sensor S3 are equal (L1=L2), it is possible to determine that the object X1 is sensed at the center from the forward direction of the mobile robot.

In this case, as show in (b) of FIG. 19, it is possible to extract a predetermined area 1910 of size a2×b2 from the central lower side of an original image 1900 of size a1×b1 acquired by the image acquisition unit 120.

FIGS. 20 to 24 shows examples in which an object is recognized from a side.

Figure 20:
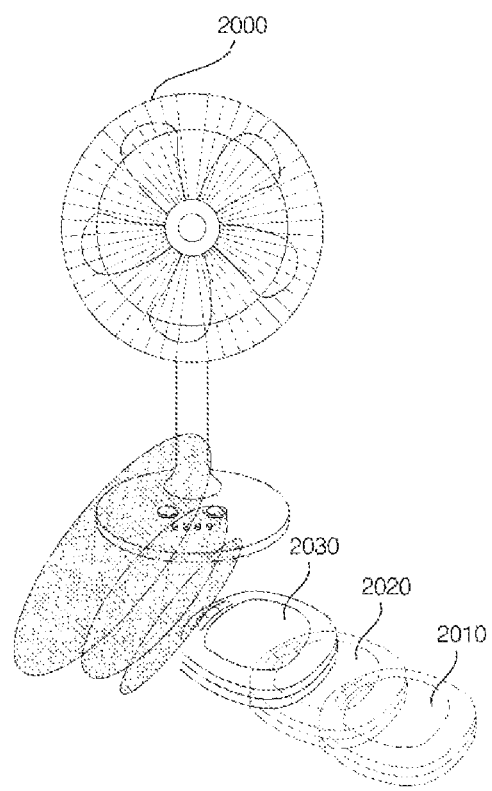

FIG. 20 shows an example in which an object 2000 is sensed from a forward-right direction of the mobile robot 100.

Figure 21:
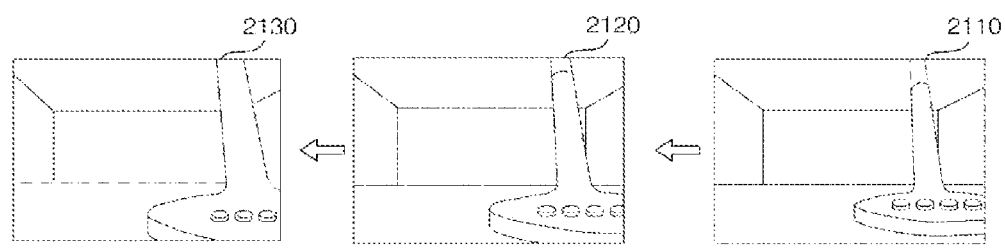

Referring to FIGS. 20 and 21, the image acquisition unit 120 may acquire a plurality of images by keeping photographing while the mobile robot 100 travels. The mobile robot 100 may acquire a first image 2110 at a first position 2010, a second image 2120 at a second position 2020, and a third image 2130 at a third position 2030.

Figure 22:
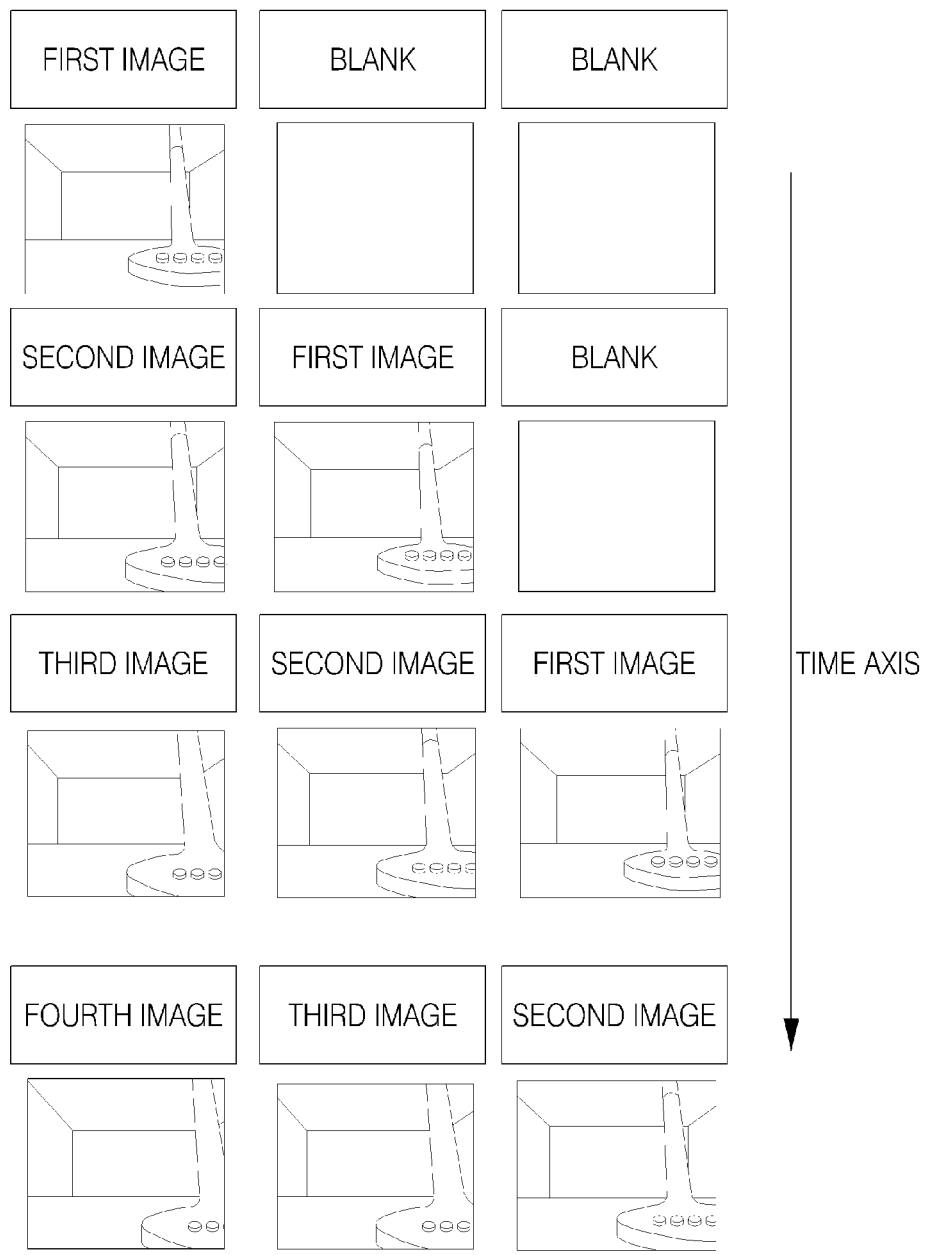

Referring to FIG. 22, a predetermined number of images may be stored in the storage 150. In addition, if a preset number of images is acquired, an image acquired at the earliest point in time may be deleted and a newly acquired image may be stored.

The present invention may store continuous images in the storage 150, determine whether a direction of travel is a forward direction, and perform an object recognition process using not the third image 2130 captured at the trigger event, but using the first image 2110, which is captured earlier than the third image 2130.

Meanwhile, it is possible to recognize an object by cropping and extracting a right area of the first image 2110, rather than using the first image 2110 intact.

Figure 23:
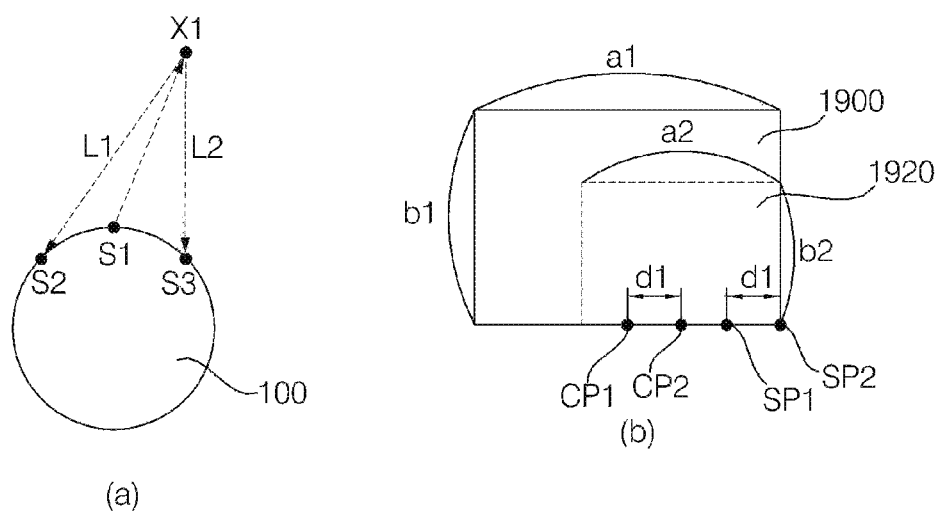
Figure 24:
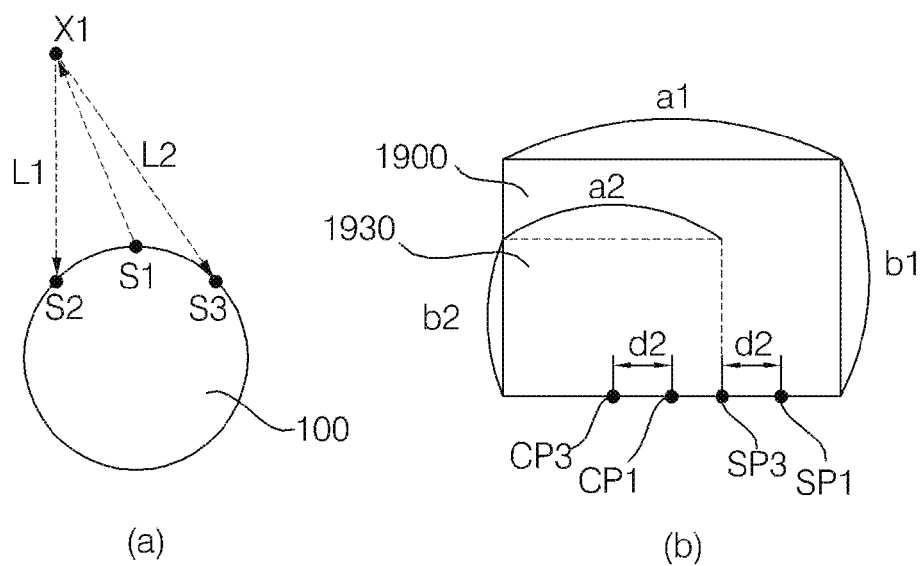

The drawing (a) of FIG. 23 shows an example in which an object X1 is sensed from a forward-right direction of the mobile robot 100, and the drawing (a) of FIG. 24 shows an example in which the object X1 is sensed from a forward-left direction of the mobile robot 100.

In addition, the controller 140 may perform control to extract an extraction target area from an image acquired by the image acquisition unit 120 by shifting the extraction target area in proportion to a difference between a distance L1 from the sensed object X1 to the second sensor S2 and a distance L2 from the sensed object X1 and the third sensor S3.

Referring to (a) of FIG. 23, if the distance L1 from the sensed object X1 to the second sensor S2 is greater than the distance L2 from the sensed object X1 to the third sensor S3 (L1>L2), it is possible to determine that the object is sensed from the forward-right direction of the mobile robot 100.

In this case, as shown in (b) of FIG. 23, it is possible to extract a predetermined area 1920 of size a2×b2 from the right lower side of an original image 1900 of size a1×b1 acquired by the image acquisition unit 120.

In comparison between (b) of FIG. 19 and (b) of FIG. 23, it is found that a central point CP2 and a start point SP2 of the extraction target area 1920 of when the object X1 is sensed from the forward-right direction of the mobile robot 100 have been shifted by a predetermined value d1 in a right direction from a central point CP1 and a start point SP1 of the extraction target area 1910 of when the object X1 is sensed at the center from the forward direction of the mobile robot 100.

In this case, shifting by the predetermined value d1 may be proportional to the difference (L1−L2) between the distance L1 from the sensed object X1 to the second sensor S2 and the distance L2 from the sensed object X1 to the third sensor S3.

Referring to (a) of FIG. 24, if the distance L1 from the sensed object X1 to the second sensor S2 is smaller than the distance L2 from the sensed object X1 to the third sensor S3 (L1<L2), it is possible to determine that the object X1 is sensed from a forward-left direction of the mobile robot 100.

In this case, as shown in (b) of FIG. 24, it is possible to extract a predetermined area 1930 of size a2×b2 from the left lower side of an original image 1900 of size a1×b1 acquired by the image acquisition unit 120.

In comparison between (b) of FIG. 19 and (b) of FIG. 24, it is found that a central point CP3 and a start point SP3 of the extraction target area 1930 of when the object X1 is sensed from the forward-left direction of the mobile robot 100 have been shifted by a predetermined value d2 in the left direction from a central point CP1 and a start point SP1 of the extraction target area 1910 of when the object X1 is sensed at the center from the forward direction of the mobile robot 100.

In this case, shifting by the predetermined value d2 may be proportional to the difference (L2−L1) between the distance L1 from the sensed object X1 to the second sensor S2 and the distance L2 from the sensed object X1 to the third sensor S3.

Meanwhile, according to an embodiment of the present invention, this method may be applied not just to forward travel but also to rotational travel.

For example, if the rotational travel is rotation by an angle smaller than a predetermined reference threshold, it is possible to select an image acquired at a specific point in time earlier than an object sensing time of the sensor unit 170 from among the plurality of continuous images.

Figure 25:
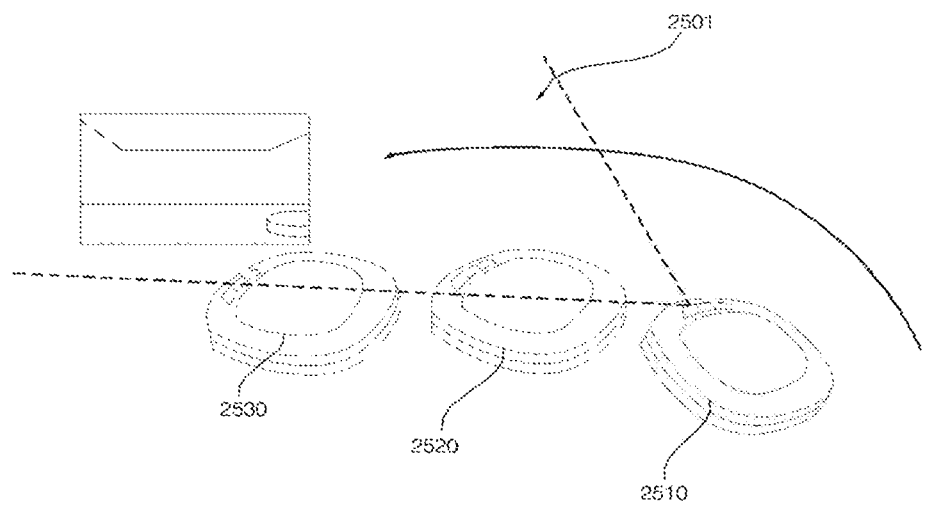

Referring to FIG. 25, the mobile robot 100 may move while rotating from a first position 2510 through the second position 2520 to a third position 2530. In this case, if the mobile robot 100 rotates by an angle smaller than a predetermined reference threshold, an object recognition process may be performed in the same manner as it does when the mobile robot 100 travels in a forward direction.

For example, if the mobile robot 100 rotates within a field of view 2501 from the first position 2510, the mobile robot 100 may perform an object recognition process in the same manner as when traveling in a forward direction.

The field of view 2501 may refer to a range in which the image acquisition unit 120 is allowed to acquire images.

Meanwhile, as the mobile robot according to an embodiment of the present invention performs a learning process with training data which is the selected image acquired at the specific point in time or an image of an extracted part of the selected image acquired at the specific point in time, the mobile robot may constantly update architectures of an ANN and a DNN.

Alternatively, the mobile robot may transmit, to a predetermined server, the selected image acquired at the specific point in time or the image of the extracted part of the selected image acquired at the specific point in time, and receive machine learning-related data from the predetermined server. Thereafter, the mobile robot may update the object recognition module 144 based on the machine learning-related data received from the predetermined server.

Figure 26:
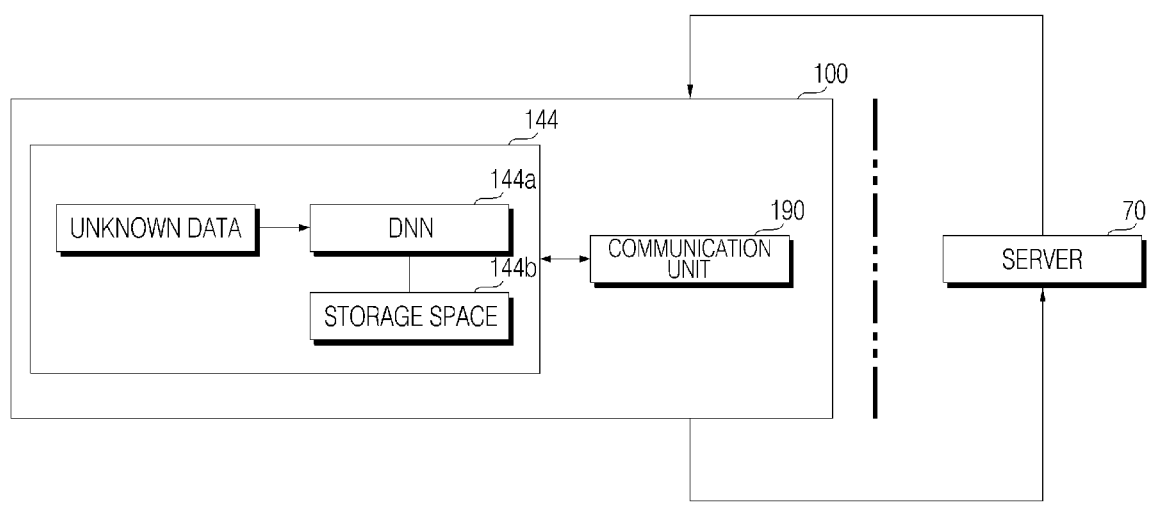
FIG. 26 is a diagram for explanation of an operation method of a mobile robot and a server according to an embodiment of the present invention.
Figure 27:
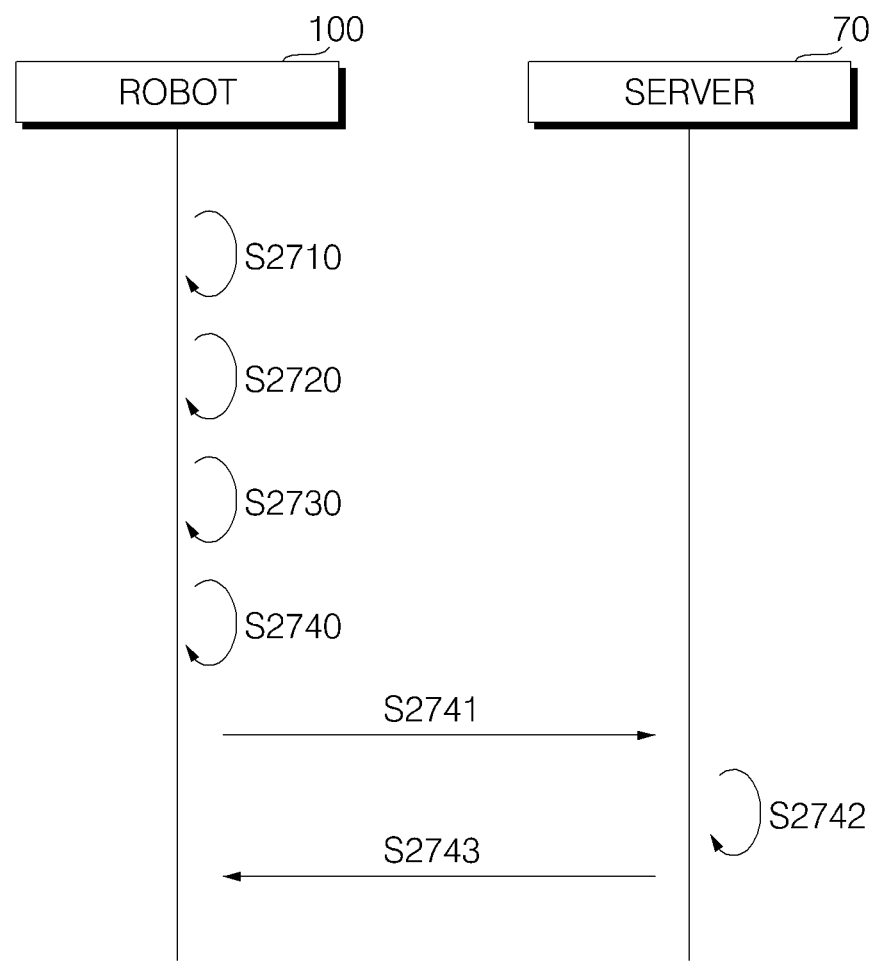
FIG. 27 is a flowchart of an operation method of a mobile robot and a server according to an embodiment of the present invention.

FIG. 26 is a diagram for explanation of an operation method of a mobile robot and a server according to an embodiment of the present invention, and FIG. 27 is a flowchart of an operation method of a mobile robot and a server according to an embodiment of the present invention.

Referring to FIGS. 26 and 27, a DNN architecture 144*a*, such as a CNN, may be embedded in the object recognition module 144 of the mobile robot 100.

A pre-learned DNN architecture 144*a* may receive input data for recognition (S2710), recognize an attribute of an object included in the input data (S2720), and output a result of the recognition (S2730).

Unknown data unrecognizable by the DNN architecture 144*a* may be stored in the storage 150 or a storage space 144*b* within the object recognition module 144 (S2740).

Meanwhile, the unknown unrecognizable by the object recognition module 144 may be transmitted to the server 70 through the communication unit 190 (S2741). In addition, data recognized by the object recognition module 144 may be transmitted to the server 70 as well.

The server 70 may generate configuration of learned weights, and the server 70 may learn the DNN architecture with training data.

The server 70 may train the DNN based on the received data (S2742), and update the DNN by transmitting updated DNN architecture data to the mobile robot 100 (S2743).

Figure 28:
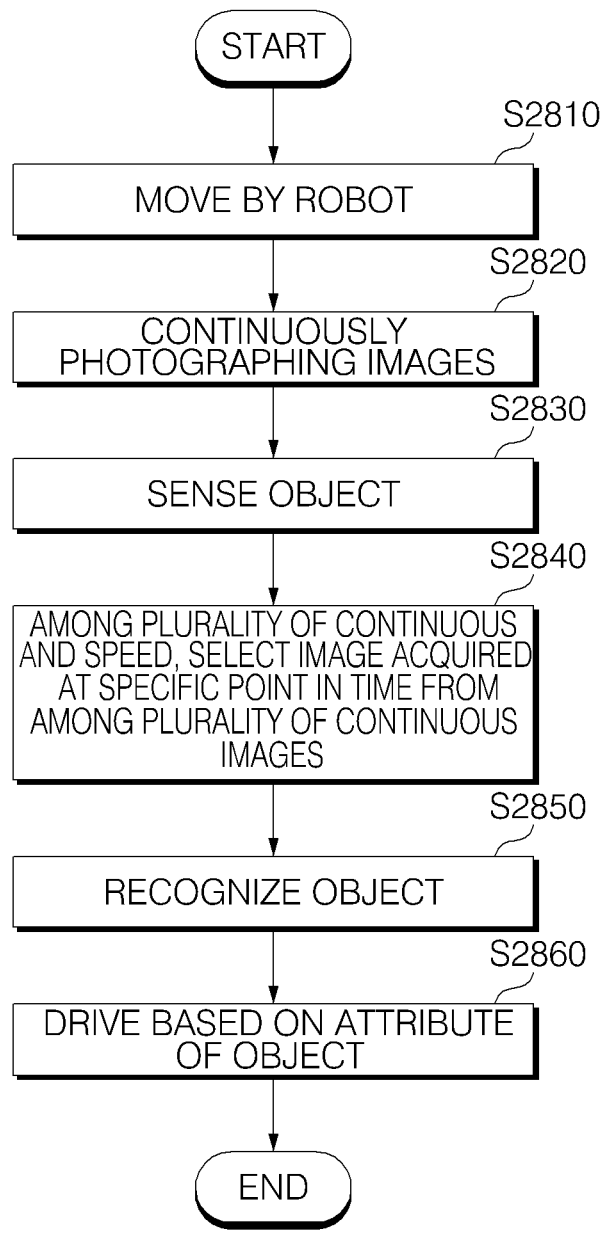
FIG. 28 is a flowchart of a method for controlling a mobile robot according to an embodiment of the present invention.

FIG. 28 is a flowchart of a method for controlling a mobile robot according to an embodiment of the present invention.

Referring to FIG. 28, firstly, the mobile robot 100, 100*a*, or 100*b* may perform cleaning while traveling according to a command or a setting (S2810).

Meanwhile, the image acquisition unit 120 may acquire a plurality of images by continuously photographing the surroundings of the main body 110 during traveling (S2820). The plurality of continuous images acquired by the image acquisition unit 120 may be stored in the storage 150.

If an object is sensed by the sensor unit 170 during traveling (S2830), the controller 140 may select an image acquired at a specific point in time earlier than an object sensing time of the sensor unit 170 from among the plurality of continuous images based on a moving direction and a moving speed of the main body 110 (S2840).

The moving direction and the moving speed may be calculated by the travel control module 141 or the like based on an output of an operation detection sensor of the sensing unit 170.

Meanwhile, in the case where it is set to travel at a reference speed in normal travel, the moving speed is constant, and thus, it is possible to select an image acquired at a specific point in time by determining a moving direction of the main body 100.

Meanwhile, in the case where the moving direction corresponds to forward travel or rotational travel at an angle smaller than a predetermined reference threshold (reference angle), the controller 140 may select an image acquired at a specific point in time earlier than the object sensing time of the sensor unit 170 from the plurality of continuous images.

In the case where an image is acquired in response to a signal indicative of sensing of an object by the sensor unit 170, the mobile robot is still traveling and thus the acquired image may not include a feature of the object. In addition, in the case where a sensing range of the sensor unit 170 is short, an acquired image is more likely not to include a feature of an object.

Accordingly, in the case of forward travel or approximately forward travel, the controller 140 may select an image acquired at a specific point in time earlier than the object sensing time of the sensor unit 170 based on a moving direction and a moving speed.

In this case, if the moving speed is slower, the controller 140 may select an image acquired at a point in time further earlier than the object sensing time of the sensor unit 170.

If the moving speed is faster, the mobile robot 100 travels a longer distance after the object sensing time of the sensing time 170. In other words, when the image acquisition unit 120 acquires a plurality of images at a constant speed, the mobile robot travels a longer distance during a period of time between a point in time to capture a specific frame and a point in time to capture a subsequent frame.

Therefore, as a moving speed increases, the probability that the area occupied by the object in the image is high is high in selecting the image at the point in time when the sensor unit 170 detects the object.

In contrast, as a moving speed decreases, the image acquisition unit 120 acquires more images while traveling the same distance, and thus, it may be preferable to select an image captured at a point in time further earlier than an object sensing time of the sensor unit 170.

The object recognition module 144 may select the image acquired at the specific point in time, and use the image as input data for recognition of the object.

Based on data pre-learned through machine learning, the object recognition module 144 may recognize an attribute of an object included in the selected image acquired at the specific point in time (S2850).

The object recognition module 144 may include an ANN trained to recognize attributes such as types of objects through machine learning, and recognize an attribute of an object based on pre-learned data (S2850).

For example, a CNN, which is one of deep learning architectures, may be embedded in the object recognition module 144, and a pre-trained CNN may recognize an attribute of an object included in input data and output a result of the recognition.

Meanwhile, the travel control module 141 may control the travel drive unit 160 based on the recognized attribute of the object (S2860).

For example, if the recognized object is an object having a height that the mobile robot 100 is not able to climb, the travel control module 141 may perform control to travel while detouring around the object.

In addition, if the recognized object is an object, such as a low bump, having a height that the mobile robot 100 is able to climb, such as a low door threshold, the travel control module 141 may perform control to keep traveling in a forward direction.

In addition, if an object is recognized as an object that can restrict the mobile robot 100 during traveling even though the object is a low height object such as a fan base, a human hair, a multi plug, an electric wire, etc., the travel control module 141 may perform control to travel while detouring around the object.

Figure 29:
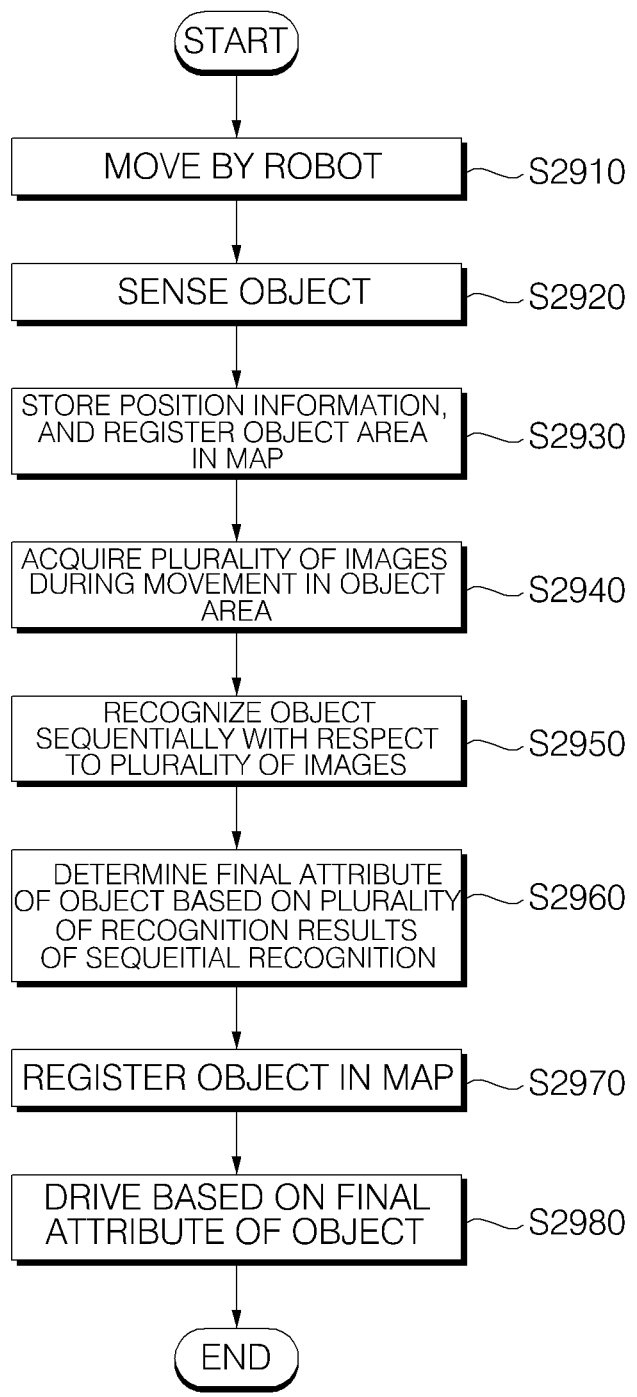
FIG. 29 is a flowchart of a method for controlling a mobile robot according to an embodiment of the present invention.

FIG. 29 is a flowchart of a method for controlling a mobile robot according to an embodiment of the present invention.

Referring to FIG. 29, the mobile robot 100, 100*a*, or 100*b* may perform cleaning while moving according to a command or a setting (S2910).

The sensor unit 170 may include an object detection sensor 131 and sense an object within a predetermined range in a forward direction of the moving direction. (S2920).

If an object is sensed by the sensor unit 170 (S2920) during movement, position information of the sensed object and position information of the mobile robot 100, 100*a*, or 100*b* may be stored in the storage 150 (S2930).

In addition, an area having a predetermined size around the position of the sensed object may be registered as an object area in a map stored in the storage 150 to store and manage the area (S2930).

The position information of the mobile robot may be calculated from odometry information, and the odometry information may be constructed based on data sensed by the aforementioned operation sensor of the sensor unit 170.

Meanwhile, the image acquisition unit 120 may acquire a plurality of images in the object area during the movement (S2940).

The image acquisition unit 120 may register the object area, and acquire a plurality of images by continuously photographing images in the object area before the mobile robot 100, 100*a*, or 100*b* departs out of the object area.

In addition, the mobile robot 100, 100*a*, or 100*b* may acquire an image of the entire object area while performing avoidance driving with respect to the sensed object.

Meanwhile, photographing an object area while traveling in the object area with a series of operations in order to explore the entire object area may bring significant change in a travel path of the mobile robot 100, 100*a*, or 100*b*.

Thus, it is preferable that the mobile robot 100, 100*a*, or 100*b* acquires images about an object by photographing the object area whenever passing the object area while traveling in normal travel.

For example, suppose that the mobile robot 100, 100*a*, or 100*b* travels in a basic zigzag pattern by moving in a forward direction, changing the moving direction, and then moving a distance in a direction opposite to the initial moving direction until sensing an object: in this case, the mobile robot 100, 100*a*, or 100*b* may acquire a plurality of images in a manner of acquiring a predetermined number of images by photographing while passing an object area when first traveling forward, and in a manner of acquiring a predetermined number of images by photographing while passing the object area again when returning back to the initial position.

Meanwhile, the object recognition module 144 may recognize an attribute of an object, based on data which is pre-learned through learning machine, with respect to images acquired by the image acquisition unit 120 during movement in the object area (S2950).

The object recognition module 144 may include an ANN having trained to recognize attributes such as types of objects through machine learning, and may recognize an attribute of an object based on pre-learned data (S2950).

For example, a CNN, which is one of deep learning architectures, may be embedded in the object recognition module 144, and a pretrained CNN may recognize an attribute of an object included in input data and output a result of the recognition.

After performing an object recognition process with respect to one image acquired in the object area and then performing an object recognition process with respect to another image, the object recognition module 144 may select and store a more accurate recognition result from two recognition results regarding the two images.

Meanwhile, the object recognition module 144 may compare confidences included in the two recognition results to select a more accurate recognition result. A result of the last recognition process may be the current object recognition result, and, when a recognition process is performed with respect to a subsequent image, the current object recognition result may become a previous object recognition result and a result of the recognition process with respect to the subsequent image may become the current object recognition result.

Meanwhile, when recognizing an attribute of an object sequentially with respect to images acquired by the image acquisition unit 120 (S2950), the object recognition module 144 may repeatedly compare the current object recognition result and a previous object recognition result.

Whenever the mobile robot 100, 100*a*, or 100*b* passes the object area in normal travel, an image may be acquired by photographing the object area.

The object recognition module 144 may perform an image recognition process with respect to acquired images in sequence, compare a result of the recognition with a previous object recognition result, and select a recognition result with a higher confidence.

Preferably, the object recognition module 144 may compare the current object recognition result and a previous object recognition result, and, if the current object recognition result and the previous object recognition result are identical, the object recognition module 144 may maintain the current object recognition result and increase a confidence by applying a predetermined weight.

That is, if the current object recognition result and the previous object recognition result are identical, it is not necessary to change the object recognition result, and therefore, it is possible to increase a confidence for the recognition result by applying the predetermined weight, while maintaining the object recognition result.

Thus, whenever an identical recognition result is outcome, the object recognition module 144 may perform control such that a confidence is increased by applying the predetermined weight and stored.

In addition, if the current object recognition result and the previous object recognition result are not identical, the object recognition module 144 may register a recognition result having a higher confidence out of the current object recognition result and the previous object recognition result as the new current object recognition result.

That is, the object recognition module 144 may compare the two recognition results, leave a recognition result with a higher confidence, and compare the recognition result with the higher confidence with a subsequent recognition result.

Meanwhile, the object recognition module 144 may determine a final attribute of the object based on the plurality of recognition results of the sequential recognition (S2960).

While recognizing an object sequentially, the object recognition module 144 may determine a final attribute of an object upon satisfaction of a predetermined condition. That is, the object recognition module 144 may output, as a final recognition result, a current recognition result of when the predetermined condition is satisfied.

After the predetermined condition is satisfied, an object recognition process is no longer performed, and thus, a current recognition result of when the predetermined condition is satisfied may be the last current recognition result.

For example, the last current recognition result at a time when object recognition is completed with respect to the entire object area, that is, when recognition coverage of the object area reaches 100%, may be determined as a final attribute of the object.

In some embodiments, it may be set to finish the object recognition process when the recognition coverages reaches a predetermined threshold such as 90% and 95%.

Alternatively, the object recognition module 144 may compare the current object recognition result and a previous object recognition result, and, if the current object recognition result and the previous object recognition result are identical, the object recognition module 144 may maintain the current object recognition result and change a confidence into an average between a confidence for the current object recognition result and a confidence for the previous object recognition result.

The present embodiment is an embodiment in which when the current object recognition result and the previous object recognition result are identical, a confidence for the identical recognition results is determined as an average between the existing confidences of the two recognition results.

Even in this embodiment, if the current object recognition result and the previous object recognition result are not identical, the object recognition module 144 may perform control to register a recognition result with a higher confidence out of the current object recognition result and the previous object recognition as the new current object recognition result.

Meanwhile, the travel control module 141 may control driving of the travel drive unit 160 based on a final attribute of the recognized object (S2980).

For example, if the recognized object is an object having a height that the mobile robot 100 is not able climb, the travel control module 141 may perform control to travel while detouring around the object.

In addition, if the recognized object is an object, such as a low bump, having a height that the mobile robot 100 is able to climb, the travel control module 141 may perform control to keep traveling in a forward direction.

In addition, if an object is recognized as an object that can restrict the mobile robot 100 during traveling even though the object is a low height object such as a fan base, a human hair, a multi plug, an electric wire, etc., the travel control module 141 may perform control to travel while detouring around the object.

Meanwhile, depending on the determined final attribute of the object, the object recognition module 144 may register and manage the corresponding object as a dangerous object or a non-dangerous object in the map (S2970).

For example, if the recognized object is an object having a height that the mobile robot 100 is not able to climb or if the recognized object is an object that can restrict the mobile robot 100 during traveling even though the object is a low height object such as a fan base, a human hair, a multi plug, an electric wire, etc., the object recognition module 144 may register the recognized object as a dangerous object in the map.

In addition, an object such as a bump that the mobile robot is able to climb when traveling in a forward direction may be registered as a non-dangerous object in the map.

Thereafter, based on information on a dangerous object and a non-dangerous object registered in the map, the mobile robot 100 may travel while detouring around the dangerous object.

FIGS. 30 to 34 are diagrams for explanation of a method for controlling a mobile robot according to an embodiment of the present invention.

Figure 30:
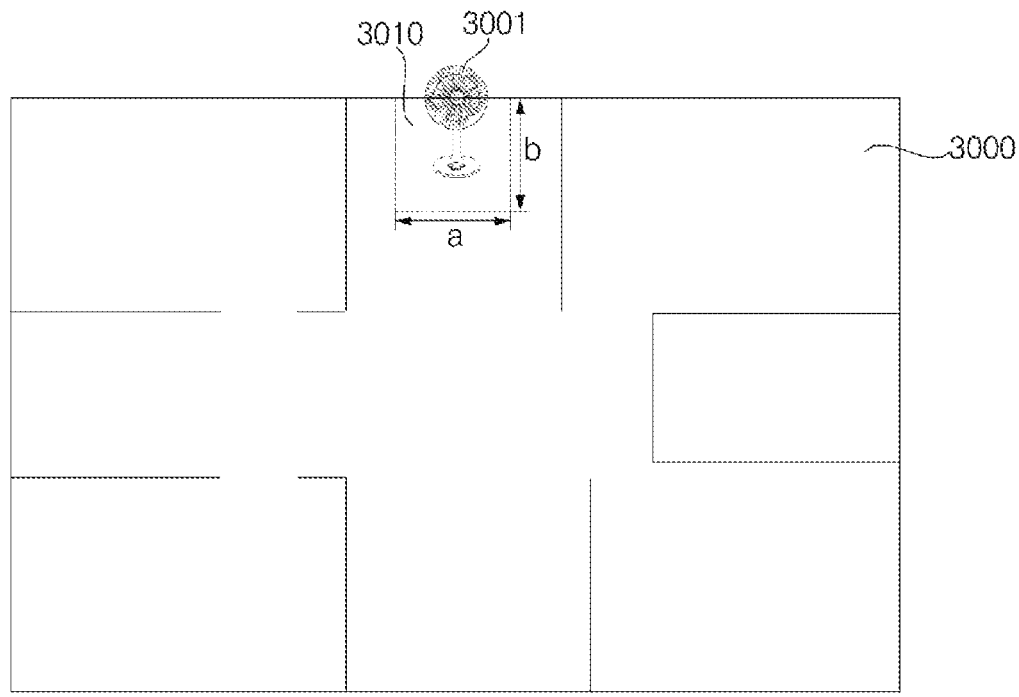
FIGS. 30 to 34 are diagrams for explanation of a method for controlling a mobile robot according to an embodiment of the present invention

Referring to FIG. 30, the mobile robot 100 may sense an object 3001 while traveling. When the mobile robot 100 senses the object 3001, an object area may be set and registered to include the surroundings of the recognized object.

Referring to FIG. 30, the object recognition module 144 may perform control to register, in a map to be stored in the storage 150, an object area 3010 having a predetermined size a×b around an object 3001 in an entire area 3000 is registered.

For example, the object area 3010 may be set to be in a rectangular shape of 1 m×1 m having each front/rear edge of 50 cm and each left/right edge of 50 cm around the object 3001.

Meanwhile, in addition to the registration of the object area 3010, the object recognition module 144 may perform control to store position information of the mobile robot 100 of when the object 3001 is recognized. Meanwhile, the position information of the mobile robot 100 may be information based on odometry information.

For example, the object recognition module 144 may perform control to store position information of an object and position information of the mobile robot in the following save format.

Save Format: (Op, Rp),
Op(X,Y)=Position of Object
Rp(X,Y)=Position of Robot

Meanwhile, the image acquisition unit 120 may acquire a plurality of images in the object area 3010 during traveling.

The image acquisition unit 120 may acquire a plurality of images by continuously photographing in the object area 3010 before the mobile robot 100 departs out of the object area 3010.

Figure 31:
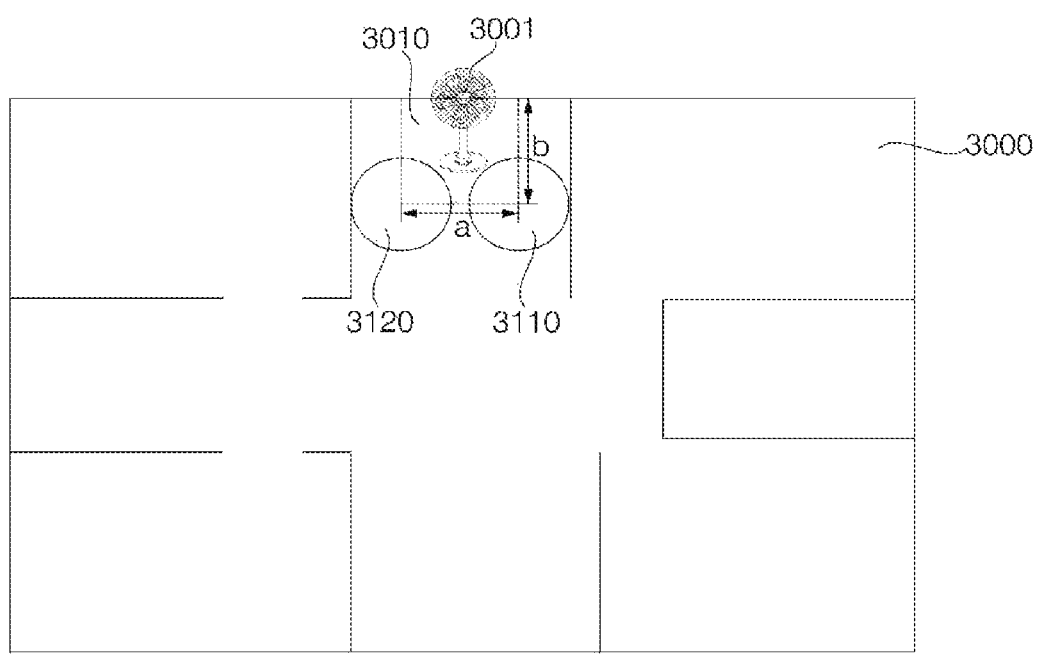

FIG. 31 shows that a predetermined area of the object area 3010 is recognized by two times of photographing. Circles 3110 and 3120 in FIG. 31 shows recognition coverages, and sizes and shapes thereof may differ depending on configuration and performance of the image acquisition unit 120.

Meanwhile, the mobile robot 100 may photograph the object 3001 at a different position in the object area 3010.

According to the present invention, by acquiring images of the object 3001 at different positions during movement in the object area 3010 and performing an object recognition process with respect to each acquired image, it is possible to enhance object recognition accuracy.

Meanwhile, the object recognition module 144 may manage the inner area of the object area 3010 by dividing the inner area in a grid pattern with constant vertical and horizontal spacing.

Figures 32, 33, 34:
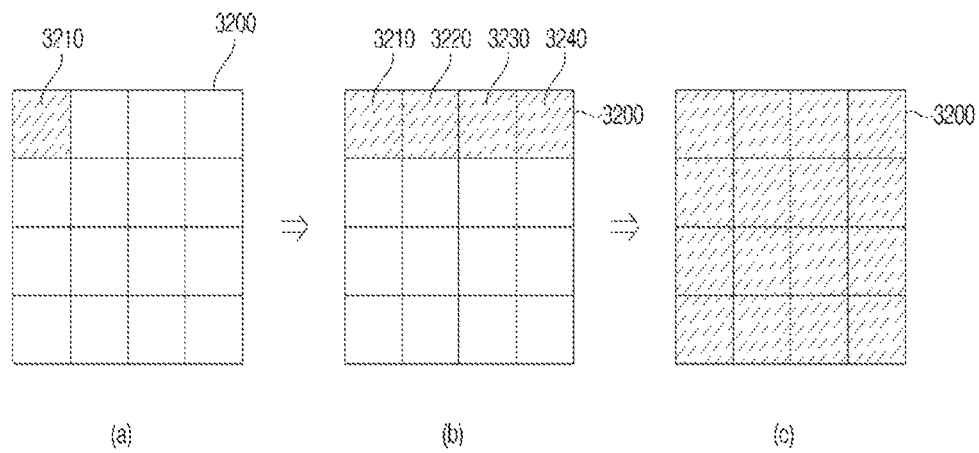

FIG. 32 shows an example of an object area 3200 in 4×4 grid pattern.

As an image of the inside of the object area 3200 is photographed, the object recognition module 144 may distinguishably store an area in which an object is recognized.

For example, as shown in (a) of FIG. 32, it is possible to distinguish a recognized area and a non-recognized area in the entire object area 3200 by changing a value of a predetermined area 3210 which has been recognized, and it is possible to determine the extent to which a recognition process has been proceeded in the entire object area 3200.

Meanwhile, depending on traveling and object recognition of the mobile robot 100, the number of recognized areas 3210, 3220, 3230, and 3240 may increase, as shown in (b) of FIG. 32.

In addition, as shown in (c) of FIG. 32, when the recognition coverage reaches 100%, that is, when the object recognition process is completed in the entire object area 3200, the object recognition process may be terminated.

Alternatively, according to a setting, when the recognition coverage reaches 90% or 95%, the object recognition process may be terminated.

FIGS. 33 and 34 show part of a sequential object recognition process with respect to the same object according to an embodiment of the present invention.

Referring to FIGS. 33 and 34, firstly, the object recognition module 144 may recognize an image acquired at a first position Rp1 and recognize an object as a fan. For example, a current recognition result indicative of recognition of a fan may have a confidence of 0.8.

Meanwhile, the aforementioned recognition result is the first recognition result and no other comparative subject exists, and therefore, a registration result corresponding to the current recognition result may be a fan.

Meanwhile, secondly, the object recognition module 144 may obtain a recognition result indicative of a fan with a confidence of 0.7, based on an image acquired at a second position Rp2 of the mobile robot.

Since the first recognition result and the second recognition result are identical, the object recognition module 144 may maintain a fan as the registration result corresponding to the current recognition result.

In this case, one of confidences for the two recognition results may be used as a confidence for the current recognition result.

Alternatively, as shown in FIG. 33, 0.7 which is an average of confidences of the first recognition result and the second recognition result may be used as a confidence for the current recognition result.

More preferably, since the first recognition result and the second recognition result identically indicate a fan, a confidence of 0.835 which has been increased with a predetermined weight applied, as shown in FIG. 25, may be used as a confidence for the current recognition result.

Referring to FIGS. 33 and 34, based on an image acquired at a third position Rp3 by the mobile robot, the object recognition module 144 may obtain a recognition result indicative of a lamp base with a confidence of 0.7.

Referring to FIGS. 33 and 34, the object recognition module 144 may compare the third recognition result with a previous recognition result.

As the confidence of 0.7 for the third recognition result is lower than a confidence of 0.75 or 0.835 for a previous recognition result, the object recognition module 144 may select a fan having a higher confidence as a registration result corresponding to the current recognition result.

According to at least one of the embodiments of the present invention, it is possible to acquire image data that helps increase accuracy of recognizing an attribute of an object.

According to at least one of the embodiments of the present invention, since a mobile robot is capable of determining an attribute of an object and adjusting a traveling pattern according to the attribute of the object, it is possible to perform highly reliable object recognition and avoidance.

In addition, according to at least one of the embodiments of the present invention, it is possible to provide a mobile robot and a method for controlling the mobile robot, the mobile robot which is capable of moving forward, moving backward, stopping, detouring, and the like according to a recognition result on an object, thereby enhancing user convenience and improving operational efficiency and cleaning efficiency.

In addition, according to at least one of the embodiments of the present invention, it is possible to provide a mobile robot and a method for controlling the mobile robot, the mobile robot which is capable of accurately recognizing an attribute of an object based on learning machine.

In addition, according to at least one of the embodiments of the present invention, it is possible for a mobile robot to perform machine learning efficiently and extract data for recognition As can be seen from the foregoing, the mobile robot according to the present invention is not limited to the configuration and method of the embodiments described above, but all or some of the embodiments may be configured to be selectively combined such that various modifications of the embodiments can be implemented.

Meanwhile, the mobile robot according to the embodiments of the present invention may be implemented in a recording medium, which may be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, an optical data memory, etc., and may be implemented in a shape of carrier wave such as transmission through Internet. Also, the recording medium that can be read by the processor may be distributed in a computer system connected thereto through the network, whereby codes that can be read by the processor may be stored and implemented in a distributive mode.

While the disclosed embodiment has been particularly shown and described with reference to exemplary aspects thereof, it will be understood that various changes in form and details may be made therein without departing from the spirit and scope of the following claims, and It should be understood that many variations and modifications of the basic inventive concept described herein will still fall within the spirit and scope of the present invention as defined in the appended claims and their equivalents.

What is claimed is:

1. A mobile robot comprising:
a travel drive unit configured to move a main body of the mobile robot;
an image acquisition unit configured to acquire a plurality of images by continuously photographing surroundings of the main body;
a storage configured to store the plurality of continuous images acquired by the image acquisition unit;
a sensor unit having one or more sensors configured to sense an object during the movement of the main body; and
a controller configured to, when the sensor unit senses the object, select an image acquired at a specific point in time earlier than an object sensing time of the sensor unit from among the plurality of continuous images, and recognize an attribute of the object included in the selected image acquired at the specific point in time,
wherein the specific point in time earlier than the object sensing time is determined based on a moving direction and a moving speed of the main body, and wherein the controller is further configured to select images acquired at relatively greater lengths of time before the object sensing time of the sensor unit when the main body is moving at relatively slower speeds.

2. The mobile robot of claim 1, wherein the controller further comprises a travel control module configured to control driving of the travel drive unit based on the recognized attribute of the object.

3. The mobile robot of claim 1, wherein the controller is further configured to, when the moving direction corresponds to forward travel or rotational travel at an angle smaller than a predetermined reference threshold, select the image acquired at the specific point in time earlier than the object sensing time of the sensor unit from among the plurality of continuous images.

4. The mobile robot of claim 1, wherein the controller is further configured to recognize, based on data pre-learned through machine learning, an attribute of an object included in the selected image acquired at the specific point in time.

5. The mobile robot of claim 1, further comprising a communication unit configured to transmit the selected image acquired at the specific point in time to a predetermined server, and receive machine learning-related data from the predetermined server.

6. The mobile robot of claim 5, wherein the object recognition module is further configured to be updated based on the machine learning-related data received from the predetermined server.

7. The mobile robot of claim 1, wherein the controller further comprises an image processing module configured to extract a part of the selected image acquired at the specific point in time in correspondence to a direction of the object sensed by the sensor is present.

8. The mobile robot of claim 7, wherein the image processing module is further configured to:
when the object is sensed from a forward-right direction of the main body, extract a right lower area of the selected image acquired at the specific point in time;
when the object is sensed from a forward-left direction of the main body, extract a left lower area of the selected image acquired at the specific point in time; and
when the object is sensed from a forward direction of the main body, extract a central lower area of the selected image acquired at the specific point in time.

9. The mobile robot of claim 1, wherein the controller is further configured to:
store position information of the sensed object and position information of the mobile robot in the storage;
register an area of a predetermined size around a position of the sensed object as an object area in a map;
recognize the attribute of the object sequentially with respect to images acquired by the image acquisition unit in a predetermined object area; and
determine a final attribute of the object based on a plurality of recognition results of the sequential recognition.

10. A method for controlling a mobile robot, comprising:
acquiring a plurality of images by continuously photographing surroundings of a main body of the mobile robot during traveling using an image acquisition unit;
storing the plurality of continuous images acquired by the image acquisition unit;
sensing an object by a sensor unit;
when the sensor unit senses the object, selecting an image acquired at a specific point in time earlier than an object sensing time of the sensor unit from among the plurality of continuous images;
recognizing an attribute of the object included in the selected image acquired at the specific point in time; and
controlling driving of a travel control unit configured to move the main body of the mobile robot based on the recognized attribute of the object, wherein the specific point earlier than the object sensing time is determined based on a moving direction and a moving speed of the main body, and
the selecting of the image acquired at the specific point in time comprises selecting an image acquired at a relatively greater length of time before the object sensing time when the main body is moving at a relatively slower speed.

11. The method of claim 10, wherein the selecting of the image acquired at the specific point in time comprises, when the moving direction corresponds to forward travel or rotational travel at an angle smaller than a predetermined reference threshold, selecting the image acquired at the specific point in time earlier than the object sensing time of the sensor unit from among the plurality of continuous images.

12. The method of claim 10, wherein the recognizing of the attribute of the object comprises recognizing, based on data pre-learned through machine learning, an attribute of an object included in the selected image acquired at the specific point in time.

13. The method of claim 10, further comprising:
transmitting the selected image acquired at the specific point in time to a predetermined server; and
receiving machine learning-related data from the predetermined server.

14. The method of claim 13, further comprising updating an object recognition module based on the machine learning-related data received from the predetermined server.

15. The method of claim 10, further comprising extracting a part of the selected image acquired at the specific point in time in correspondence to a direction from which the object is sensed by the sensor unit.

16. The method of claim 15, wherein the extracting of the part of the selected image acquired at the specific point in time comprises:
when the object is sensed from a forward-right direction of the main body, extract a right lower area of the selected image acquired at the specific point in time;
when the object is sensed from a forward-left direction of the main body, extract a left lower area of the selected image acquired at the specific point in time; and
when the object is sensed from a forward direction of the main body, extract a central lower area of the selected image acquired at the specific point in time.

17. The method of claim 10, wherein the controlling of the driving of the travel control unit comprises performing control to perform an avoidance operation when the sensed object is not an object that the mobile robot is able to climb.

18. The method of claim 10, further comprising:
when the sensor unit senses an object, storing position information of the sensed object and position information of the mobile robot in the storage and registering an area having a predetermined size around a position of the sensed object as an object area in a map;
recognizing the attribute of the object sequentially with respect to images acquired by the image acquisition unit during movement in the object area; and
determining a final attribute of the object based on a plurality of recognition results of the sequential recognition.

* * * * *